US012541914B2

(12) United States Patent
Xu et al.

(10) Patent No.: US 12,541,914 B2
(45) Date of Patent: Feb. 3, 2026

(54) IMAGE RENDERING METHOD AND APPARATUS, DEVICE, AND STORAGE MEDIUM TO PERFORM DIRECT ILLUMINATION USING LIGHT SOURCE GRIDS

(71) Applicant: TENCENT TECHNOLOGY (SHENZHEN) COMPANY LIMITED, Shenzhen (CN)

(72) Inventors: Liming Xu, Shenzhen (CN); Dong Dong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 248 days.

(21) Appl. No.: 18/348,101

(22) Filed: Jul. 6, 2023

(65) Prior Publication Data

US 2024/0005592 A1 Jan. 4, 2024

Related U.S. Application Data

(63) Continuation of application No. PCT/CN2022/131698, filed on Nov. 14, 2022.

(30) Foreign Application Priority Data

Jan. 26, 2022 (CN) ......................... 202210090734.8

(51) Int. Cl.
*G06T 15/04* (2011.01)
*G06T 15/50* (2011.01)
*G06T 15/80* (2011.01)

(52) U.S. Cl.
CPC ........... *G06T 15/506* (2013.01); *G06T 15/04* (2013.01); *G06T 15/80* (2013.01)

(58) Field of Classification Search
CPC ....... G06T 15/506; G06T 15/04; G06T 15/80; G06T 5/50; G06T 7/90; G06T 15/205; G06T 2207/20221; G06T 15/55
See application file for complete search history.

(56) References Cited

U.S. PATENT DOCUMENTS 5,268,996 A 12/1993 Steiner et al.
2011/0012901 A1* 1/2011 Kaplanyan ............ G06T 15/506 345/426

(Continued)

FOREIGN PATENT DOCUMENTS

CN 111260766 A 6/2020
CN 114119853 A 3/2022

(Continued)

OTHER PUBLICATIONS

Dachsbacher, C., & Stamminger, M. (Apr. 2005). Reflective shadow maps. In Proceedings of the 2005 symposium on Interactive 3D graphics and games (pp. 203-231). (Year: 2005).*

(Continued)

*Primary Examiner* — Daniel F Hajnik
*Assistant Examiner* — Adeel Bashir
(74) *Attorney, Agent, or Firm* — Anova Law Group, PLLC

(57) ABSTRACT

An image rendering method includes: acquiring a project scene, materials of an object in the project scene including a light source material, and the light source material being a material that is endowed with a light source attribute by setting a corresponding shading model to be a custom grid light source shading model; searching object grids with the light source material from the project scene, and performing light source structure conversion on the object grids with the light source material to obtain light source grids, the object grids being grids used for forming the object in the project scene; and using each of the light source grids as a light (Continued)

104
Server
Data storage system
Communication network
102
Terminal
For example source, to perform direct illumination rendering on each of pixels of the image representing the project scene, and fusing a direct illumination rendering result of each of the light source grids for each of the pixels to obtain a rendered target image.

18 Claims, 9 Drawing Sheets

(56) References Cited

U.S. PATENT DOCUMENTS

| | | | |
|---|---|---|---|
| 2012/0173206 | A1 | 7/2012 | Chang et al. |
| 2015/0262407 | A1 | 9/2015 | Fursund et al. |

FOREIGN PATENT DOCUMENTS

| | | | |
|---|---|---|---|
| CN | 114119853 | B | 6/2022 |
| WO | 2022007787 | A1 | 1/2022 |

OTHER PUBLICATIONS

Lighting Scenes with Millions of Lights Using RTX Direct Illumination by Chris Wyman (Year: 2020).*

Bitterli, B., Wyman, C., Pharr, M., Shirley, P., Lefohn, A., & Jarosz, W. (2020). Spatiotemporal reservoir resampling for real-time ray tracing with dynamic direct lighting. ACM Transactions on Graphics (TOG), 39(4), 148-1. (Year: 2020).*

Lensing, P., & Broll, W. (Mar. 2013). Efficient shading of indirect illumination applying reflective shadow maps. In Proceedings of the ACM SIGGRAPH Symposium on Interactive 3D graphics and games (pp. 95-102). (Year: 2013).*

The European Patent Office (EPO) The Extended European Search Report for Application No. 22923401.8 Jan. 17, 2025 10 Pages.

Anonymous: "mesh—How can I convert multiple faces of an object to light?—Blender Stack Exchange", Feb. 9, 2021 (Feb. 9, 2021), pp. 1-3.

China National Intellectual Property Administration (CNIPA) Office Action 1 for 202210090734.Mar. 8, 11, 2022 9 Pages (including translation).

The World Intellectual Property Organization (WIPO) International Search Report for PCT/CN2022/131698 Jan. 17, 2023 13 Pages (including translation).

Joakim Dahl, et al., "2D Sampling with Multidimensional Transformations", Physically Based Rendering online https://pbr-book.org/3ed-2018/Monte_Carlo_Integration/2D_Sampling_with_Multidimensional_Transformations#SamplingaTriangle 11 pages, 2018.

Brian Karis, et al., "Real Shading in Unreal Engine 4". https://cdn2.unrealengine.com/Resources/files/2013SiggraphPresentationsNotes-26915738.pdf 59 pages, 2013.

Wikipedia contributors. (Jun. 19, 2023). Solid angle. In Wikipedia, The Free Encyclopedia. Retrieved 20:10, Jul. 6, 2023, from https://en.wikipedia.org/w/index.php?title=Solid_angle&oldid=1160879096.

Lumen Global Illumination and Reflections,A high level overview of Lumen's dynamic global illumination and reflections features. https://docs.unrealengine.com/5.0/en-US/RenderingFeatures/Lumen/ 16 pages, 2023.

RTX Global Illumination (RTXGI), NVIDIA Developer, https://developer.nvidia.com/rtxgi 9 pages.

* cited by examiner

IMAGE RENDERING METHOD AND APPARATUS, DEVICE, AND STORAGE MEDIUM TO PERFORM DIRECT ILLUMINATION USING LIGHT SOURCE GRIDS

RELATED APPLICATIONS

This application is a continuation application of PCT Patent Application No. PCT/CN2022/131698 filed on Nov. 14, 2022, which claims priority to Chinese Patent Application No. 2022100907348, entitled "IMAGE RENDERING METHOD AND APPARATUS, DEVICE, AND STORAGE MEDIUM" filed with the Chinese Patent Office on Jan. 26, 2022, all of which are incorporated by reference in entirety.

FIELD OF THE TECHNOLOGY

The present disclosure relates to the technical field of image processing, and in particular to an image rendering method and apparatus, a device, and a storage medium.

BACKGROUND

With the development of image processing technologies, an illumination rendering technology appears. The illumination rendering technology is a technology to perform illumination rendering on an object in a scene. For example, illumination rendering can be performed on an object in a game scene by using the illumination rendering technology. In certain existing technology, the influence of the object with a self-luminous material on illumination of the scene is to determine, through indirect illumination, whether reflected light hits the object after reaching the surface of the object or not, so as to obtain illumination contribution of the self-luminous material to the surface of the object.

However, the indirect illumination solution has met with poor illumination rendering effect on the object in the scene, so that a finally rendered image often comes with unwanted noise and lower image quality.

SUMMARY

According to various embodiments provided in the present disclosure, an image rendering method and apparatus, a device and a medium are provided.

In a first aspect, the present disclosure provides an image rendering method, executed by a terminal, the method including: acquiring a project scene, materials of an object in the project scene including a light source material, and the light source material being a material that is endowed with a light source attribute by setting a corresponding shading model to be a custom grid light source shading model; searching object grids with the light source material from the project scene, and performing light source structure conversion on the object grids with the light source material to obtain light source grids, the object grids being grids used for forming the object in the project scene; and using each of the light source grids as a light source, to perform direct illumination rendering on each of pixels of the image representing the project scene, and fusing a direct illumination rendering result of each of the light source grids for each of the pixels to obtain a rendered target image.

In a second aspect, the present disclosure provides an image rendering apparatus, the apparatus including: a memory storing computer program instructions; and a processor coupled to the memory and configured to execute the computer program instructions and perform: acquiring a project scene, materials of an object in the project scene including a light source material, and the light source material being a material that is endowed with a light source attribute by setting a corresponding shading model to be a custom grid light source shading model; searching object grids with the light source material from the project scene, and performing light source structure conversion on the object grids with the light source material to obtain light source grids, the object grids being grids used for forming the object in the project scene; and using each of the light source grids as a light source, to perform direct illumination rendering on each of pixels of the image representing the project scene, and fusing a direct illumination rendering result of each of the light source grids for each of the pixels to obtain a rendered target image.

In a third aspect, the present disclosure provides a computing device, including a memory and one or more processors, the memory storing computer-readable instructions, and when executing the computer-readable instructions, the processor implementing the steps of the methods according to embodiments of the present disclosure.

In a fourth aspect, the present disclosure provides one or more computer-readable storage media, storing computer-readable instructions, the computer-readable instructions, when executed by one or more processors, implementing the steps of the methods according to embodiments of the present disclosure.

In a fifth aspect, the present disclosure provides a computer program product, including computer-readable instructions, the computer-readable instructions, when executed by a processor, implementing the steps of the methods according to embodiments of the present disclosure.

Other aspects of the present disclosure may be understood by those skilled in the art in light of the description, the claims, and the drawings of the present disclosure.

Details of one or more embodiments of the present disclosure are provided in the accompanying drawings and descriptions below. Other features, objectives, and advantages of the present disclosure become apparent from the present disclosure, the drawings, and the claims.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of embodiments. When and as applicable, the term "an embodiment," "one embodiment," "some embodiment(s), "some embodiments," "certain embodiment(s)," or "certain embodiments" may refer to the same subset or different subsets of embodiments, and may be combined with each other without conflict.

In certain embodiments, the term "based on" is employed herein interchangeably with the term "according to."

Figure 1:
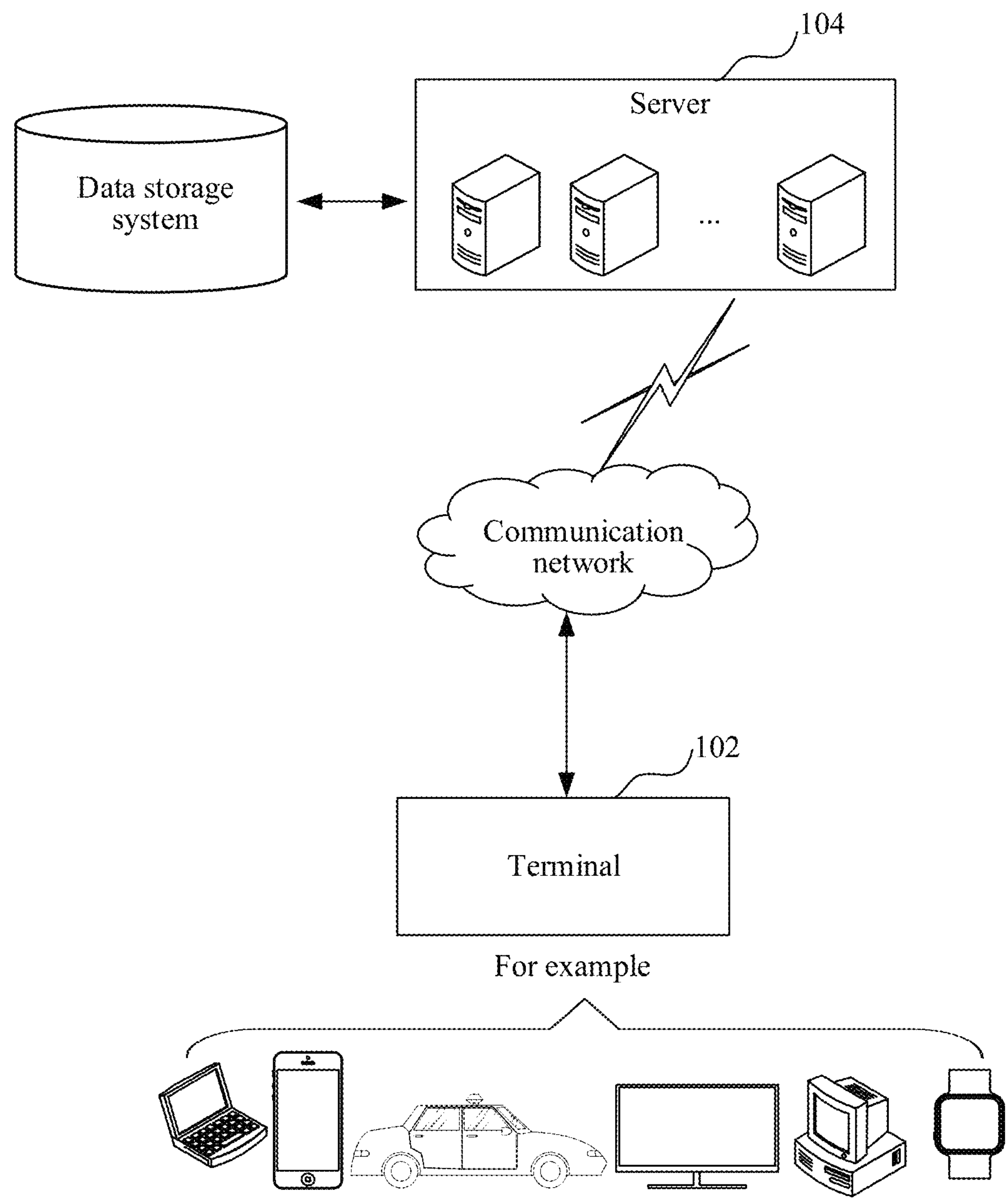
FIG. 1 is a diagram of an implementation environment of an image rendering method according to certain embodiment(s) of the present disclosure.

An image rendering method provided by the present disclosure may be applied to an implementation environment shown in FIG. 1. A terminal 102 communicates with a server 104 by using a network. The terminal 102 may be, but not limited to, various personal computers, notebook computers, smart phones, tablet computers, portable wearable devices and vehicle-mounted terminals. The server 104 may be an independent physical server, may also be a server cluster or a distributed system composed of a plurality of physical servers, and may also be a cloud server which provides cloud computing services such as cloud services, cloud databases, cloud computing, cloud functions, cloud storage, network services, cloud communications, middleware services, domain name services, security services, CDN, and big data and artificial intelligence platforms. The terminal 102 and the server 104 may be directly or indirectly connected by wired or wireless communication, which is not limited in the present disclosure.

The terminal 102 may acquire a project scene. Materials of an object in the project scene includes a light source material. The light source material is a material that is endowed with a light source attribute by setting a corresponding shading model to be a custom grid light source shading model. The terminal 102 may search object grids with the light source material from the project scene, and perform light source structure conversion on the object grids with the light source material to obtain light source grids. The object grids are grids used for forming the grid of the object in the project scene. The terminal 102 may use each of light source grids as a light source, to perform direct illumination rendering on each of pixels of the image representing the project scene, and fuse a direct illumination rendering result of each of the light source grids for each of the pixels, to obtain a rendered target image.

In certain embodiment(s), the term "project scene" refers to a scene-to-be-rendered. Further, an image representing the scene may be referred to as a project image.

It is to be understood that the server 104 may provide the project scene, and the terminal 102 may perform illumination rendering on the project scene provided by the server 104. The terminal 102 may also acquire the project scene locally, and perform illumination rendering on the project scene acquired locally. This embodiment does not limit this, and it is to be understood that the implementation scene in FIG. 1 is only a schematic illustration and is not limited to this.

Figure 2:
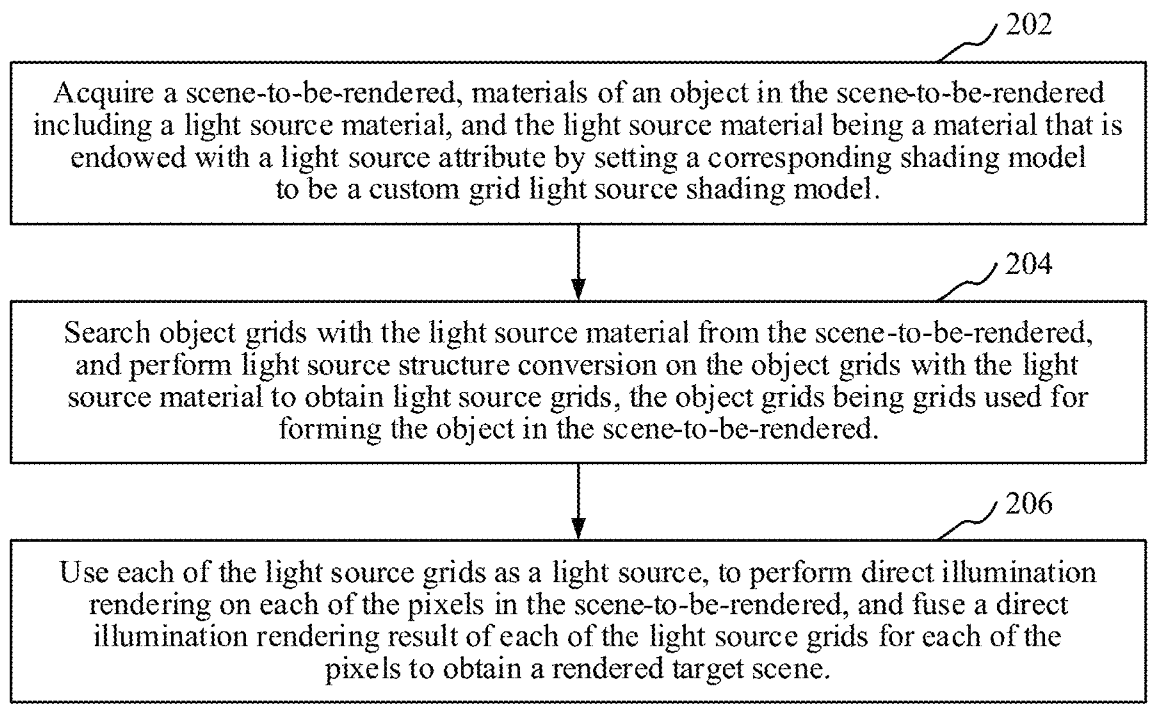
FIG. 2 is a schematic flowchart of an image rendering method according to certain embodiment(s) of the present disclosure.

In an embodiment, as shown in FIG. 2, an image rendering method is provided. The method may be applied to a terminal, executed by the terminal alone, also implemented through interaction between the terminal and the server. This embodiment is described by using an example in which the method is applied to the terminal 102 in FIG. 1, and the method includes the following steps:

Step 202: Acquire a project scene. Materials of an object in the project scene includes a light source material. The light source material is a material that is endowed with a light source attribute by setting a corresponding shading model to be a custom grid light source shading model.

The project scene is an image to be rendered. The materials of the object refer to a series of parameters and resource for describing the surface properties of the object, such as at least one of the reflectivity, roughness and self-luminescence of the surface of the object. The light source material refers to a material with the light source attribute, that is, the light source material has the ability to serve as a light source, and can perform direct illumination rendering on a scene. The shading model is a formula used for describing how a special material receives and reflects light. The grid light source shading model is a shading model used for endowing the material with the light source attribute, so that the object grid with this material can be used as a light source. The light source attribute refers to an attribute that can be used as a light source to directly illuminate the object in the project scene. It is to be understood that only after the shading model of a material is set as a custom grid light source model, the material has the light source attribute, and can perform direct illumination rendering on a scene. Therefore, the light source material is a material that can perform direct illumination rendering through customization, which is a different concept from a self-luminous material that realizes indirect illumination rendering.

In an embodiment, the terminal may acquire scene data-to-be-rendered, and generate a project scene based on the scene data-to-be-rendered.

In an embodiment, a project scene is stored in the server, and the terminal may communicate with the server and acquire the project scene from the server.

Figure 3:
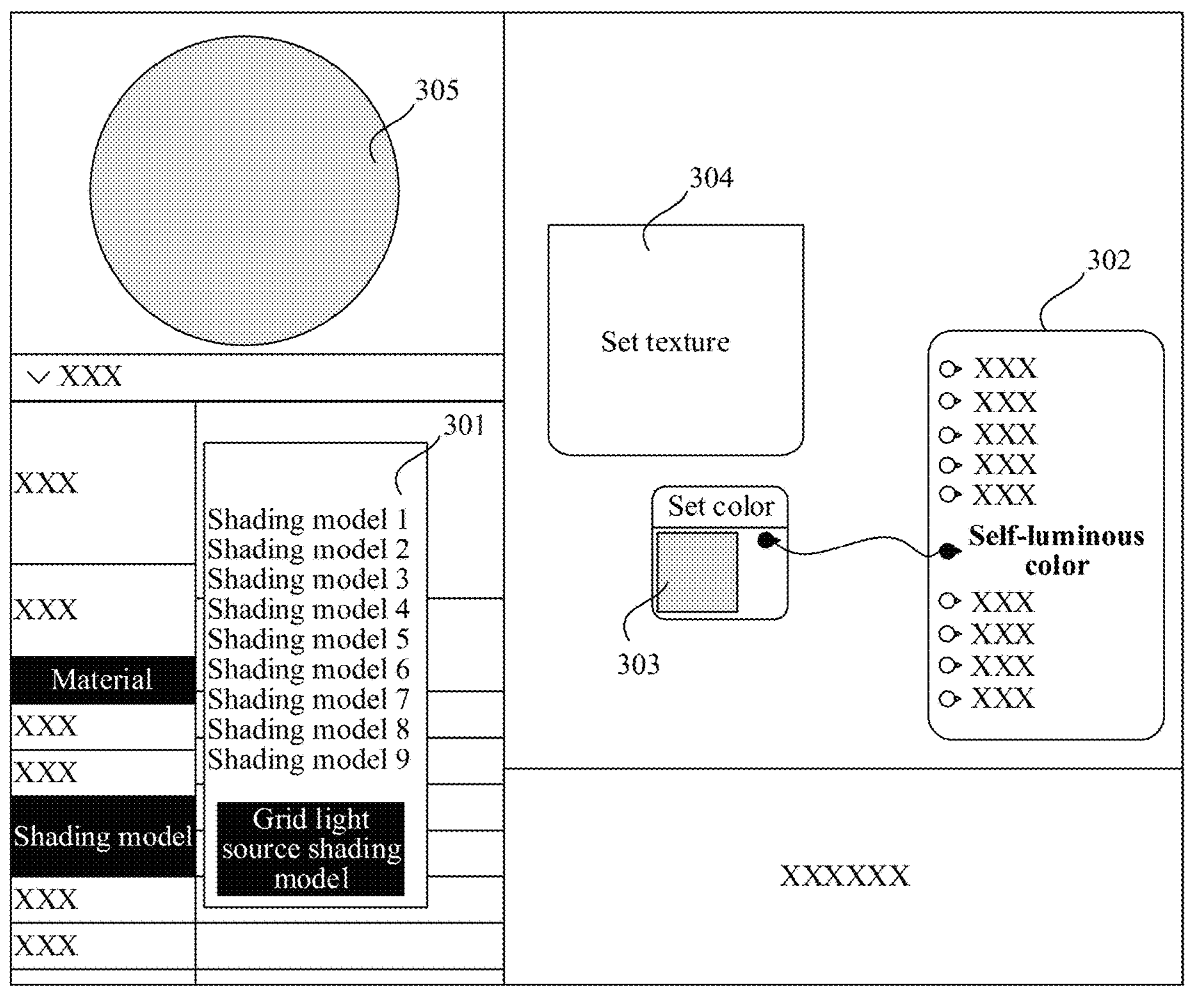
FIG. 3 is a schematic diagram of an interface for setting a shading model of a material according to certain embodiment(s) of the present disclosure.

In an embodiment, as shown in FIG. 3, the terminal may set the shading model of the certain material as the custom grid light source shading model, that is, various shading models are preset in 301 of FIG. 3, and the terminal may set the shading model of this material as the custom grid light source shading model in response to a selection operation for the grid light source shading model in 301. The terminal may further set a self-luminous color value (as shown in 303) of this material in the grid light source shading model based on self-luminous color setting options in 302. The terminal may further set a texture color for this material based on a texture color setting region 304. 305 shows an illumination effect on this material.

Step 204: Search object grids with the light source material from the project scene, and perform light source structure conversion on the object grids with the light source material to obtain light source grids. The object grids are grids used for forming the grid of the object in the project scene.

Light source structure conversion is a process to convert object structures of the object grids into light source structures. The light source grids are object grids with the light source attribute. It is to be understood that the light source grids refer to the object grids that can be directly used as light sources to directly illuminate the object in the project scene.

In certain embodiment(s), the object in the project scene is composed of many object grids, and these object grids may include the object grids with the light source material. The terminal may search the object grids with the light source material from the numerous object grids in the project scene. It is to be understood that the terminal may determine the shading model corresponding to each of the object grids, and determine the object grids of which the shading models are the custom grid light source shading models as the object grids with the light source material that is to be searched. The terminal may perform light source structure conversion on the searched object grids with the light source material, to obtain the light source grids.

In an embodiment, the terminal may use each object grid as a search unit, and determine the material of each of the object grids one by one from the numerous object grids in the project scene, so as to search out the object grids with the light source material.

In an embodiment, the terminal may perform light source structure conversion on the searched object grids with the light source material, to obtain initial light source grids. The terminal may screen out the light source grids serving as light sources from the initial light source grids.

In an embodiment, the terminal may perform light source structure conversion on the searched object grids with the light source material, and directly use the object grids with the light source material after light source structure conversion as the light source grids.

In an embodiment, the object grids may be any polygonal object grids, for example, the object grids may be triangular object grids, quadrangular object grids, or pentagonal object grids, and the grid shapes of the object grids are not limited in this embodiment.

Step 206: Use each light source grid as a light source, to perform direct illumination rendering on each of pixels of the image representing the project scene, and fuse a direct illumination rendering result of each of the light source grids for each of the pixels to obtain a rendered target image.

Direct illumination refers to an illumination effect that each of the pixels of the image representing the project scene is directly illuminated by the light source. It is to be understood that direct illumination is a process of calculating illumination contribution directly from the light source to each of the pixels of the image representing the project scene. Direct illumination rendering refers to a rendering mode that takes the light source grid as the light source to perform direct illumination calculation on the pixel of the image representing the project scene. The direct illumination rendering result refers to a rendering result obtained by performing image rendering on each of the pixels of the image in a direct illumination rendering mode.

In certain embodiment(s), the terminal may use each of the light source grids as the light source, to perform direct illumination rendering on each of the pixels of the image representing the project scene, so as to obtain the direct illumination rendering result of each of the pixels. The terminal may fuse the direct illumination rendering result of each of the light source grids for each of the pixels, to obtain the rendered target image based on the fused direct illumination rendering results.

Figure 4:
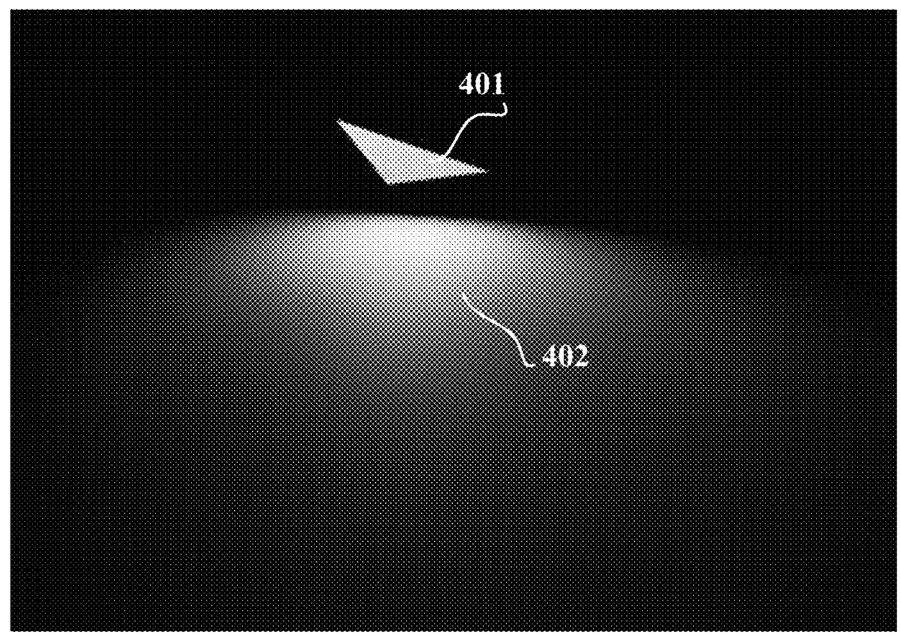
FIG. 4 is a schematic diagram of a light source grid serving as a light source to directly illuminate a scene according to certain embodiment(s) of the present disclosure.

In an embodiment, as shown in FIG. 4, the terminal may use a light source grid 401 as a light source, to perform direct illumination rendering on a ground 402 in a project scene. It can be seen from FIG. 4 that the light source grid 401 illuminates a part of the ground 402.

Figure 5:
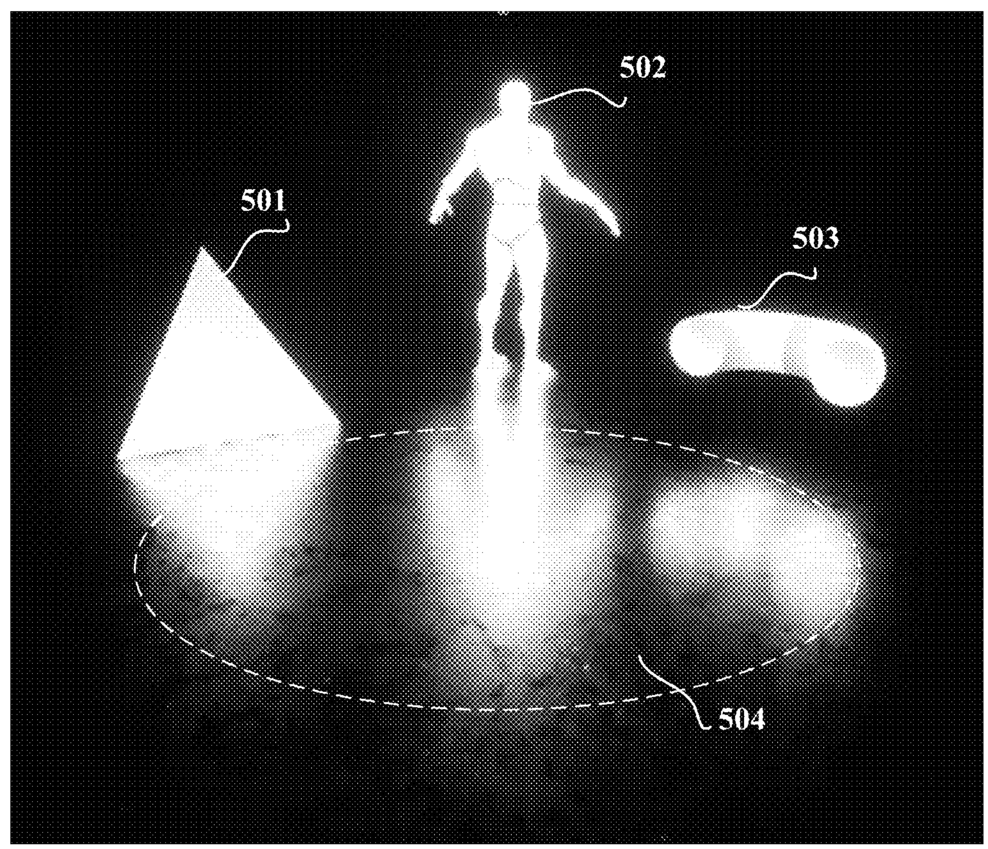
FIG. 5 is a schematic diagram of a light source grid serving as a light source to directly illuminate a scene according to certain embodiment(s) of the present disclosure.

In an embodiment, as shown in FIG. 5, a project scene includes objects 501, 502 and 503 with the light source material, the objects 501, 502 and 503 each being composed of a plurality of light source grids. The objects 501, 502 and 503 may perform direct illumination rendering on a scene through the respective light source grids. For example, 504 in FIG. 5 shows the effect of direct illumination rendering on the ground.

In the image rendering method, the project scene is acquired. The materials of the object in the project scene include the light source material, the light source material being the material that is endowed with the light source attribute by setting the corresponding shading model to be the custom grid light source shading model. By searching the object grids with the light source material from the project scene, and performing light source structure conversion on the object grids with the light source material, the light source grids that can be directly used as the light sources can be obtained. By using each of the light source grids as the light source, direct illumination rendering can be performed on each of the pixels of the image representing the project scene; and by fusing the direct illumination rendering result of each of the light source grids for each of the pixels, the rendered target image can be obtained. By directly using the light source grid obtained through light source structure conversion as the light source to perform direct illumination rendering on each of the pixels of the image representing the project scene, the illumination rendering effect of the object in the scene can be improved, so that the noise of the finally rendered target image can be reduced, and the image quality can be improved.

Figure 6:
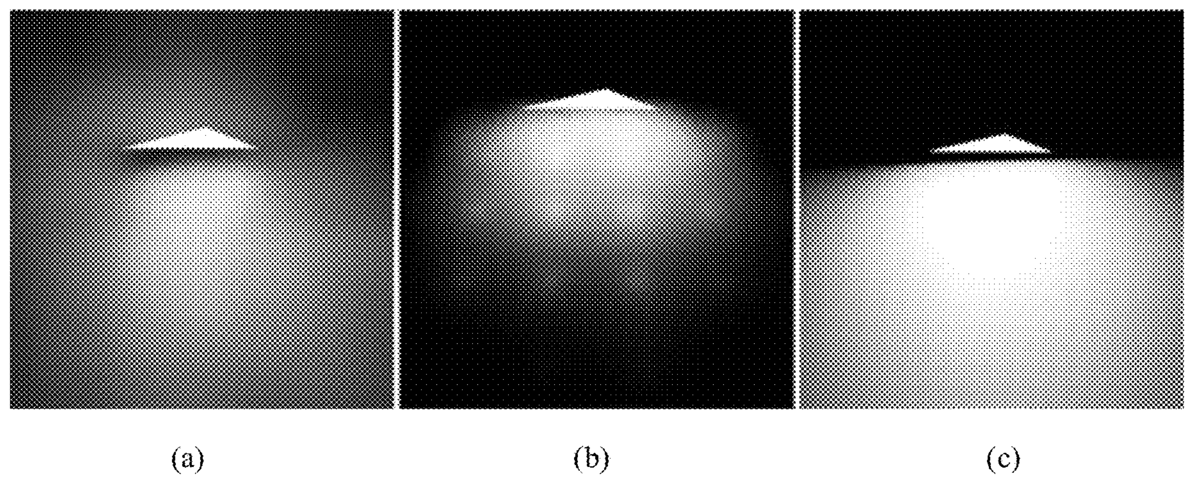
FIG. 6 is a schematic diagram of illumination effect comparison between a direct illumination solution according to certain embodiment(s) of the present disclosure and a certain existing indirect illumination solution.

In FIG. 6, (a) and (b) are illumination effects on the scene realized by an indirect illumination solution, where the illumination effect in (a) of FIG. 6 has a piece of bright and a piece of dark, and the rendered image has a lot of noise.

The illumination effect in (b) of FIG. 6 has many white dots, and the rendered image also has a lot of noise. In FIG. 6, (c) is an illumination effect on the scene realized by the direct illumination solution of the present disclosure, where the illumination effect in (c) of FIG. 6 is closest to a real illumination effect, the rendered target image has less noise, and the image quality is improved.

In an embodiment, the same object in the project scene includes a plurality of grid regions of the same material. The grid regions of the same material are regions which are composed of a plurality of adjacent object grids of the same material in the same object. Searching the object grids with the light source material from the project scene, and performing light source structure conversion on the object grids with the light source material to obtain light source grids includes: search, from the grid regions of the same material in the project scene, the grid regions of the same material with the light source attribute, to obtain self-luminous grid regions of the same material; each of the object grids included in the self-luminous grid regions of the same material being the object grid of the light source material; and perform light source structure conversion on the object grids of the light source material in the self-luminous grid region of the same material, to obtain the light source grids.

The self-luminous grid regions of the same material are grid regions of the same material with the light source attribute. It is to be understood that the object grids in the same self-luminous grid region of the same material have the same light source material.

In certain embodiment(s), the project scene includes many objects, and each object may include a plurality of grid regions of the same material, where the plurality of grid regions of the same material may include the grid regions of the same material with the light source attribute. The terminal may search the grid regions of the same material with the light source attribute from the grid regions of the same material in the project scene, and use the searched grid regions of the same material with the light source attribute as the self-luminous grid regions of the same material. The self-luminous grid region of the same material includes a plurality of object grids with the light source material, and the terminal may perform light source structure conversion on the object grids with the light source material in the self-luminous grid region of the same material, to obtain the light source grids.

In an embodiment, the terminal may generate a plurality of search tasks, each search task including a plurality of grid regions of the same material, one search task corresponding to one search thread, and the search threads being processed in parallel. The terminal may search the grid regions of the same material with the light source attribute through the search thread corresponding to each of the search tasks, to obtain self-luminous grid regions of the same material.

In an embodiment, the light source grid is a light source triangular grid, and the terminal may define the light source triangular grid as the following structure:

```
{
    Pos; // Pos represents the coordinates of one vertex V0 of the light source triangular grid
    Edge0; // Edge0 represents one edge taking V0 as the vertex
    Edge1; // Edge1 represents the other edge taking V0 as the vertex
    Normal; // Normal represents a normal of the light source triangular grid
    TriangleArea; // TriangleArea represents the grid area of the light source triangular grid
```

-continued

```
    Radiance; // Radiance represents the radiant illumination information of the light source triangular grid
    }.
```

In the embodiment, by first searching the self-luminous grid regions of the same material from the grid regions of the same material in the project scene, and performing light source structure conversion on the object grids of the light source material in the self-luminous grid region of the same material, to obtain the light source grids, the speed of searching the object grids with the light source material and the efficiency of generating the light source grids can be improved.

In an embodiment, performing light source structure conversion on the object grids with the light source material in the self-luminous grid region of the same material, to obtain the light source grids includes: acquire, for each of the self-luminous grid regions of the same material, a calculation scheduling instruction corresponding to the self-luminous grid region of the same material; and enable a calculation shader according to the calculation scheduling instruction, to execute a plurality of threads in the calculation shader, and perform light source structure conversion in parallel on the object grids of the light source material in the self-luminous grid region of the same material, to obtain the light source grids.

The calculation scheduling instruction is a computer instruction used for enabling the calculation shader. The calculation shader is a shader with flexible function, used for realizing relatively complex operations on a graphics processing unit (GPU).

In certain embodiment(s), for each self-luminous grid region of the same material, the terminal may acquire the calculation scheduling instruction corresponding to the self-luminous grid region of the same material. It is to be understood that one calculation scheduling instruction is acquired for one self-luminous grid region of the same material. The terminal may enable the calculation shader in response to the calculation scheduling instruction, and the enabled calculation shader may execute the plurality of threads therein, to perform light source structure conversion in parallel on the object grids with the light source material in the self-luminous grid region of the same material through the plurality of threads, to obtain the light source grids.

In an embodiment, the quantity of the enabled calculation threads of the calculation shader may be the same as the quantity of the object grids in the self-luminous grid region of the same material. It is to be understood that one object grid in the self-luminous grid region of the same material may correspond to one calculation thread, and the object grids in the self-luminous grid region of the same material may be processed in parallel through the calculation threads.

In the embodiment, light source structure conversion are performed in parallel on the object grids of the light source material in the self-luminous grid region of the same material through the enabled threads, of which the quantity is the same as the quantity of the object grids in the self-luminous grid region of the same material, so that the efficiency of light source structure conversion can be further improved.

In an embodiment, the quantity of the enabled calculation threads of the calculation shader may be different from the quantity of the object grids in the self-luminous grid region of the same material. It is to be understood that the plurality of object grids in the self-luminous grid region of the same material may correspond to one calculation thread, and the object grids in the self-luminous grid region of the same material can be processed in parallel through the calculation thread.

In the embodiment, for each of the self-luminous grid regions of the same material, the calculation shader can be enabled through the calculation scheduling instruction corresponding to the self-luminous grid region of the same material; and by executing the plurality of threads in the calculation shader, light source structure conversion can be performed in parallel on the object grids of the light source material in the self-luminous grid region of the same material, to obtain the light source grids, so that the processing efficiency of the object grids of the light source material in the self-luminous grid region of the same material is improved.

In an embodiment, using each of the light source grids as the light source, to perform direct illumination rendering on each of the pixels of the image representing the project scene includes: use each of the light source grids as the light source, and determine radiant illumination information of the light source grid; and perform, based on the radiant illumination information of each of the light source grids, direct illumination rendering on each of the pixels of the image representing the project scene;

The radiant illumination information is illumination information radiated by the light source grid as the light source.

In certain embodiment(s), the terminal may use each of the light source grids as the light source. For each of the light source grids as the light source, the terminal may determine the radiant illumination information of the light source grid. The terminal may perform, based on the radiant illumination information of each of the light source grids, direct illumination rendering on each of the pixels of the image representing the project scene.

In the embodiment, each of the light source grids is used as the light source, and the radiant illumination information of the light source grid can be determined; and based on the radiant illumination information of each of the light source grids, direct illumination rendering can be performed on each of the pixels of the image representing the project scene, so that the illumination rendering effect of each of the pixels of the image representing the project scene can be improved.

In an embodiment, the radiant illumination information includes a radiant color value. Determining the radiant illumination information of the light source grid includes: in response to that the light source grid is a solid color light source grid, use a self-luminous color value corresponding to the solid color light source grid as the radiant color value of the solid color light source grid; the self-luminous color value being a color value preset in a grid light source shading model corresponding to the solid color light source grid.

The radiant color value is a color value radiated by the light source grid as the light source. The solid light source grid is the light source grid including a single color. It is to be understood that the color values of the pixels in the solid color light source grid are the same.

In certain embodiment(s), in response to that the light source grid is the solid color light source grid, the terminal may determine the self-luminous color value corresponding to the solid color light source grid, and directly use the self-luminous color value corresponding to the solid color light source grid as the radiant color value of the solid color light source grid.

In an embodiment, the terminal may set a color value in a grid light source shading model of the light source grid. As shown in FIG. 1, the self-luminous color value, corresponding to the solid color light source grid, set in 303 can be directly used as the radiant color value of the solid color light source grid.

In the embodiment, in response to that the light source grid is the solid color light source grid, the self-luminous color value corresponding to the solid color light source grid is directly used as the radiant color value of the solid color light source grid, so that the calculation speed of the radiant color value of the solid color light source grid can be improved.

In an embodiment, the radiant illumination information includes a radiant color value. Determining the radiant illumination information of the light source grid includes: in response to that the light source grid is a texture light source grid, determine an average color value of texture colors in the texture light source grid, to obtain the radiant color value of the texture light source grid.

The texture source grid is the light source grid with textures. It is to be understood that the color values of the pixels in the texture light source grid may be different.

In certain embodiment(s), in response to that the light source grid is the texture light source grid, the terminal may determine the average color value of the texture colors in the texture light source grid. It is to be understood that the terminal may determine the color value of each of the pixels in the texture light source grid, and average the color values of the pixels in the texture light source grid to obtain the average color value of the texture colors. The terminal may directly use the average color value of the texture colors in the texture light source grid as the radiant color value of the texture light source grid.

In the embodiment, in response to that the light source grid is the texture light source grid, the average color value of the texture colors in the texture light source grid can be determined, and the average color value is used as the radiant color value of the texture light source grid, so that the calculation speed of the radiant color value of the texture light source grid can be improved.

In an embodiment, in response to that the light source grid is the texture light source triangular grid, determining the average color value of the texture colors in the texture light source triangular grid, to obtain the radiant color value of the texture light source triangular grid includes: in response to that the light source grid is the texture light source triangular grid, determine the length of each of the edges in the texture light source triangular grid; determine the length of the shortest edge in the texture light source triangular grid, and determine a first texture information change rate of the texture light source triangular grid in a texture space; determine, according to the corresponding lengths of the two long edges of the texture light source triangular grid, a second texture information change rate of the texture light source triangular grid in the texture space; the two long edges being two edges except the shortest edge of the texture light source triangular grid; and determine, according to the first texture information change rate and the second texture information change rate corresponding to the texture light source triangular grid, the average color value of the texture colors in the texture light source triangular grid, to obtain the radiant color value of the texture light source triangular grid.

The texture light source triangular grid is a triangular texture light source grid. The shortest edge refers to the edge with the shortest length of the texture light source triangular grid. The texture information change rate is used for representing the change of texture information of the texture light source triangular grid. The first texture information change rate is the texture information change rate obtained based on the length of the shortest edge of the texture light source triangular grid. The second texture information change rate is the texture information change rate obtained based on the corresponding lengths of the two long edges of the texture light source triangular grid.

In certain embodiment(s), in response to that the light source grids are the texture light source triangular grids, for each of texture light source triangular grids, the terminal may determine the length of each of edges of the texture light source triangular grid. It is to be understood that the terminal may determine the length of the shortest edge of the texture light source triangular grid, and the corresponding lengths of the two long edges of the texture light source triangular grid. The terminal may calculate, according to the length of the shortest edge of the texture light source triangular grid, the first texture information change rate of the texture light source triangular grid in the texture space, and calculate, according to the corresponding lengths of the two long edges of the texture light source triangular grid, the second texture information change rate of the texture light source triangular grid in the texture space. The terminal may calculate, according to the first texture information change rate and the second texture information change rate corresponding to the texture light source triangular grid, the average color value of the texture colors in the texture light source triangular grid, and directly use the calculated average color value as the radiant color value of the texture light source triangular grid.

In an embodiment, the terminal may use the first texture information change rate and the second texture information change rate corresponding to the texture light source triangular grid as parameters of a level determination function, to obtain a corresponding level of texture mapping. The terminal may use a texture color value corresponding to the level of the texture mapping (Mipmao) as the average color value of the texture colors in the texture light source triangular grid, and directly use the average color value as the radiant color value of the texture light source triangular grid. The level determination function is a function that is pre-built and used for determining the level of the texture mapping.

In the embodiment, by using the first texture information change rate and the second texture information change rate corresponding to the texture light source triangular grid as the parameters of the level determination function, the corresponding level of the texture mapping can be obtained, and the texture color value corresponding to the level of the texture mapping is directly used as the average color value of the texture colors in the texture light source triangular grid, so that the calculation efficiency of the average color value can be improved.

Figure 7:
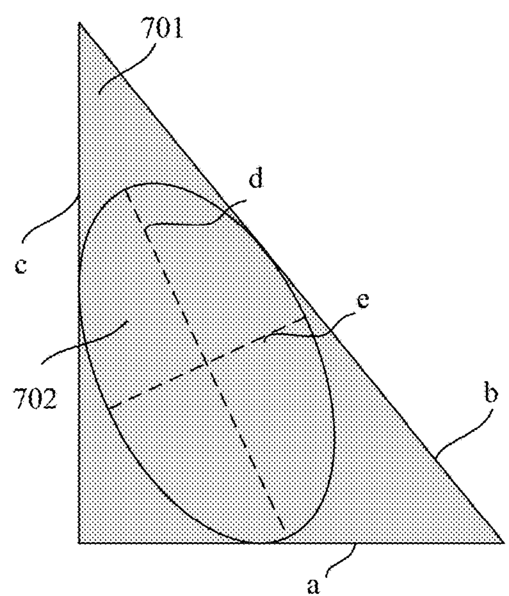
FIG. 7 is a schematic diagram of calculating a first texture information change rate and a second texture information change rate based on a light source triangular grid according to certain embodiment(s) of the present disclosure.

In an embodiment, as shown in FIG. 7, the terminal may determine the length of the shortest edge of a texture light source triangular grid 701, and the corresponding lengths of a long edge b and a long edge c of the texture light source triangular grid 701. The terminal may calculate, according to the length of the shortest edge e of the texture light source triangular grid 701, a first texture information change rate e of the texture light source triangular grid 701 in a texture space, and calculate, according to the corresponding lengths of the two long edges b and c of the texture light source triangular grid 701, a second texture information change rate d of the texture light source triangular grid 701 in the texture space. It is to be understood that the length of a short axis of an inscribed ellipse in the texture light source triangular grid 701 is the first texture information change rate e, and the length of a long axis of the inscribed ellipse in the texture light source triangular grid 701 is the second texture information change rate d.

In an embodiment, the terminal may use the ratio of the length of the shortest edge of the texture light source triangular grid to a first preset constant as the first texture information change rate of the texture light source triangular grid in the texture space. The terminal may sum up the corresponding lengths of the two long edges of the texture light source triangular grid, and use the ratio of the sum result to a second preset constant as the second texture information change rate of the texture light source triangular grid in the texture space.

In an embodiment, the first texture information change rate of the texture light source triangular grid in the texture space may be calculated by using the following formula:

ShortGradient=ShortEdge*(2.0/3.0)

The second texture information change rate of the texture light source triangular grid in the texture space may be calculated by using the following formula:

LongGradient=(LongEdge1+LongEdge2)/3.0 where ShortGradient represents the first texture information change rate, ShortEdge represents the length of the shortest edge of the texture light source triangular grid, LongGradient represents the second texture information change rate, LongEdge1 and LongEdge2 represent the corresponding lengths of the two long edges of the texture light source triangular grid respectively, and 2.0 and 3.0 are the preset constants.

In the embodiment, based on the length of the shortest edge of the texture light source triangular grid, the first texture information change rate of the texture light source triangular grid in the texture space can be rapidly determined, and based on the corresponding lengths of the two long edges of the texture light source triangular grid, the second texture information change rate of the texture light source triangular grid in the texture space can be rapidly determined. According to the first texture information change rate and the second texture information change rate corresponding to the texture light source triangular grid, the radiant color value of the texture light source triangular grid can be rapidly determined, so that the calculation speed of the radiant color value of the texture light source triangular grid is improved.

In an embodiment, performing light source structure conversion on the object grids of the light source material to obtain the light source grids includes: perform light source structure conversion on the object grids of the light source material, to obtain initial light source grids; determine the grid areas and the radiant illumination information of the initial light source grids; determine, for each of the initial light source grids, luminous flux of the initial light source grid, according to the grid area and the radiant illumination information of the initial light source grid; and sample, according to the luminous flux of the initial light source grids, the initial light source grids to obtain the light source grids;

The luminous flux is light emitted by the initial light source grid as a light source in unit time. It is to be understood that the larger the luminous flux of the initial light source grid, the greater illumination contribution to each of the pixels of the image representing the project scene, and otherwise the smaller it is.

In certain embodiment(s), the terminal may perform light source structure conversion on the object grids of the light source material, to obtain the initial light source grids. The terminal may determine the grid area and the radiant illumination information of each of the initial light source grids. For each of the initial light source grids, the terminal may calculate the luminous flux of the initial light source grid according to the grid area and the radiant illumination information of the initial light source grid, and sample the initial light source grids according to the luminous flux of the initial light source grids to obtain the light source grids. It is to be understood that the light source grid with larger luminous flux is easier to be sampled. Based on the luminous flux, a part of the initial light source grids which have more illumination contribution to each of the pixels of the image representing the project scene are selected as the light source grids for subsequent direct illumination calculation.

In an embodiment, the radiant illumination information includes a radiant color value. The terminal may multiply the grid area of the initial light source grid by the radiant color value of the initial light source grid, and multiply the multiplying result by Pi, to obtain the luminous flux of the initial light source grid.

In an embodiment, the luminous flux of the initial light source grid may be calculated by using the following formula:

$$\text{Flux}=\text{SurfaceArea}*\text{EmissiveColor}*Pi$$

where Flux represents the luminous flux of the initial light source grid, SurfaceArea represents the grid area of the initial light source grid, EmissiveColor represents the radiant color value of the initial light source grid, and Pi represents the ratio of the circumference of a circle to its diameter.

In the embodiment, by performing light source structure conversion on the object grids of the light source material, the initial light source grids can be obtained, and the light source grids are obtained by sampling the initial light source grids according to the luminous flux of the initial light source grids, so that the noise of the finally rendered target image can be further reduced, and the image quality can be improved.

In an embodiment, performing direct illumination rendering on each of the pixels of the image representing the project scene based on the radiant illumination information of each of the light source grids includes: determine, for each of the light source grids, a direct illumination contribution value of the light source grid to each of the pixels of the image representing the project scene; and determine, according to the direct illumination contribution value and the radiant illumination information, a rendering illumination value contributed by the light source grid to each of the pixels of the image representing the project scene. Fusing the direct illumination rendering result of each of the light source grids for each of the pixels to obtain the rendered target image includes: fuse the rendering illumination value of each of the light source grids for each of the pixels, to obtain the rendered target image.

The direct illumination contribution value is an illumination weight value contributed through direct illumination on each of the pixels of the image representing the project scene by the light source grid as the light source. The rendering illumination value is an illumination value that each of the pixels of the image representing the project scene finally receives from the light source grid and is used for illumination rendering. It is to be understood that the illumination value corresponding to the radiant illumination information generated by the light source grid as the light source is not equal to the rendering illumination value finally received by each of the pixels of the image representing the project scene. Because there is some illumination attenuation in an illumination process, the rendering illumination value finally received by each of the pixels of the image representing the project scene is generally less than the illumination value corresponding to the radiant illumination information generated by the light source grid.

In certain embodiment(s), for each of the light source grids, the terminal may determine the direct illumination contribution value of the light source grid to each of the pixels of the image representing the project scene, and calculate, according to the direct illumination contribution value and the radiant illumination information, the rendering illumination value contributed by the light source grid to each of the pixels of the image representing the project scene. The terminal may fuse the rendering illumination value of each of the light source grids for each of the pixels, to obtain the rendered target image.

In the embodiment, based on the direct illumination contribution value of the light source grid to each of the pixels of the image representing the project scene and the radiant illumination information of the light source grid, the rendering illumination value contributed to each of the pixels of the image representing the project scene can be determined, and by fusing the rendering illumination value of each of the light source grids for each of the pixels, the rendered target image can be obtained, so that the illumination rendering effect of each of the pixels of the image representing the project scene can be improved, and thus the image quality is further improved.

In an embodiment, determining, for each of the light source grids, the direct illumination contribution value of the light source grid to each of the pixels of the image representing the project scene includes: sample, for each of the light source grids, points in the light source grid according to a probability density distribution function, to obtain sampling points in the light source grid; determine, for each of the pixels of the image representing the project scene, a first contribution coefficient of each of the sampling points relative to the pixel according to location information corresponding to each of the sampling points and location information of a camera; determine, according to the included angle between incident light of each of the sampling points to the pixel and a normal of the pixel, a second contribution coefficient of each of the sampling points relative to the pixel; determine, according to a probability density distribution function value for sampling each of the sampling points, a third contribution coefficient of each of the sampling points relative to the pixel; and determine, according to the first contribution coefficient, the second contribution coefficient and the third contribution coefficient of each of the sampling points relative to the pixel, the direct illumination contribution value of the light source grid to the pixel in the project scene.

The probability density distribution function is used for representing random sampling on the points in the light source grid. The sampling points are points obtained by sampling from the light source grid. The first contribution coefficient is a contribution coefficient determined based on the location information corresponding to each of the sampling points and the location information of the camera. The second contribution coefficient is a contribution coefficient determined based on the included angle between the incident light of each of the sampling points to the pixel and the normal of the pixel. The incident light refers to light emitted from the sampling point and finally incident to the pixel in the project scene. The probability density distribution function value is a probability value that each of the sampling points is randomly sampled while sampling is performed on the points in the light source grid according to the probability density distribution function. The third contribution coefficient is a contribution coefficient determined based on the probability density distribution function value of each of the sampling points. The location information of the camera refers to the location information of the camera relative to each of the pixels of the image representing the project scene.

In certain embodiment(s), for each of the light source grids, the terminal may randomly sample the points in the light source grid according to the preset probability density distribution function, to obtain the sampling points in the light source grid. For each of the pixels of the image representing the project scene, the location information corresponding to each of the sampling points and the location information of the camera are determined, and the first contribution coefficient of each of the sampling points relative to the pixel is calculated according to the location information corresponding to each of the sampling points and the location information of the camera. The terminal may determine the included angle between the incident light of each of the sampling points to the pixel and the normal of the pixel, and calculate, according to the included angle between the incident light of each of the sampling points to the pixel and the normal of the pixel, the second contribution coefficient of each of the sampling points relative to the pixel. The terminal may determine the probability density distribution function value for sampling each of the sampling points, and calculate, according to the probability density distribution function value for sampling each of the sampling points, the third contribution coefficient of each of the sampling points relative to the pixel. The terminal may determine, according to the first contribution coefficient, the second contribution coefficient and the third contribution coefficient of each of the sampling points relative to the pixel, the direct illumination contribution value of the light source grid to the pixel in the project scene.

In an embodiment, the present disclosure provides a calculation method for the rendering illumination value of the pixel, the calculation method has a rendering equation as follows:

$$\int L_i(l) f(l, v) \cos\theta_l dl \approx \frac{1}{N}\sum_{k=1}^{N}\frac{L_i(l_k) f(l_k, v)\cos\theta_{l_k}}{p(l_k, v)}$$

where $\int L_i(l)f(l,v)\cos\theta_l dl$ represents the rendering illumination value finally received by the pixel, N represents the quantity of all the sampling points obtained by sampling from the light source grid, $L_i(l_k)$ represents the radiant illumination information of the incident light $l_k$ emitted by a $k^{th}$ sampling point, v represents the coordinates of the camera, $\theta_{l_k}$ represents the included angle between the incident light $l_k$ and the normal of the pixel, $f(l_k, v)$ is a bidirectional reflection distribution function, used for describing the intensity and direction of the light reflection after the incident light $l_k$ irradiates the pixel (that is the object), $p(l_f, v)$ represents the probability density distribution function value of the incident light $l_k$, when the coordinates of the camera are v.

It is to be understood that $f(l_k, v)$ is the first contribution coefficient, $\cos\theta_{l_k}$ is the second contribution coefficient, and $p(l_k, v)$ is the third contribution coefficient.

In the embodiment, the sampling points in the light source grid can be obtained by sampling the points in the light source grid through the probability density distribution function; the first contribution coefficient of each of the sampling points relative to the pixel can be determined according to the location information corresponding to each of the sampling points and the location information of the camera; the second contribution coefficient of each of the sampling points relative to the pixel can be determined according to the included angle between the incident light of each of the sampling points to the pixel and the normal of the pixel; and the third contribution coefficient of each of the sampling points relative to the pixel can be determined according to the probability density distribution function value used for sampling the sampling point. The direct illumination contribution value of the light source grid to the pixel in the project scene can be determined according to the first contribution coefficient, the second contribution coefficient and the third contribution coefficient of each of the sampling points relative to the pixel, so that the calculation accuracy of the direct illumination contribution value is improved, and the illumination effect is further improved.

In an embodiment, determining, according to the probability density distribution function value for sampling each of the sampling points, the third contribution coefficient of the sampling point relative to the pixel includes: determine, for each of the light source grids, the center of gravity and the grid area of the light source grid; determine, for each of the pixels of the image representing the project scene, a distance between the center of gravity of the light source grid and the pixel in the project scene; determine, based on the distance and the grid area of the light source grid, a first solid angle of the light source grid relative to the pixel; and determine, according to the first solid angle, the probability density distribution function value for sampling each of the sampling points, and use the probability density distribution function value for sampling each of the sampling points as the third contribution coefficient of the sampling point relative to the pixel.

The solid angle is an angle of the light source grid to a three-dimensional space of a pixel. It is to be understood that the solid angle is the analogy of a plane angle in the three-dimensional space. The first solid angle is a solid angle determined based on the distance between the center of gravity of the light source grid and the pixel in the project scene, as well as the grid area of the light source grid.

In certain embodiment(s), for each of the light source grids, the terminal may determine the center of gravity and the grid area of the light source grid. For each of the pixels of the image representing the project scene, the terminal may determine the distance between the center of gravity of the light source grid and the pixel in the project scene. The terminal may calculate, based on the distance and the grid area of the light source grid, the first solid angle of the light source grid relative to the pixel. The terminal may calculate, according to the first solid angle, the probability density distribution function value for sampling each of the sampling points, and directly use the probability density distribution function value for sampling each of the sampling points as the third contribution coefficient of the sampling point relative to the pixel.

In an embodiment, the terminal may directly use the reciprocal of the first solid angle as the probability density distribution function value for sampling each of the sampling points.

Figure 8:
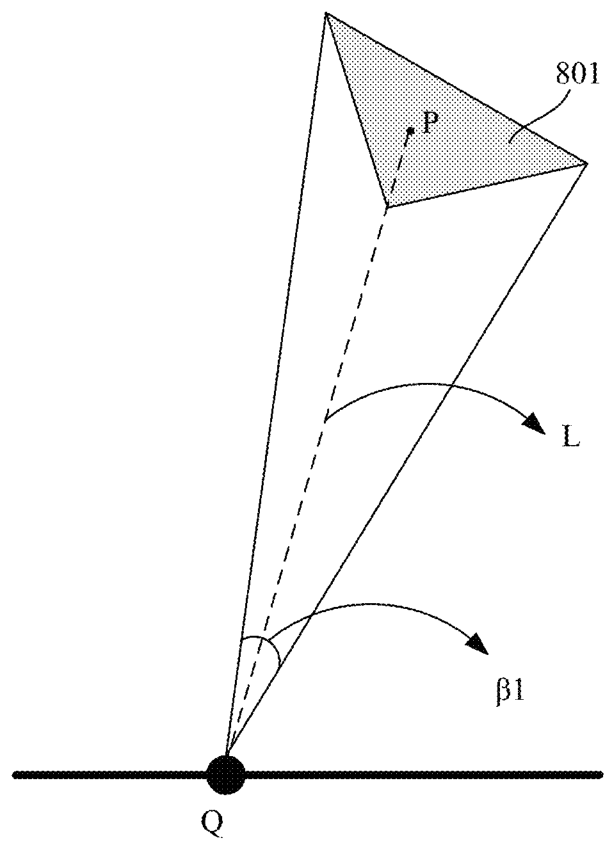
FIG. 8 is a schematic diagram of calculating a first solid angle according to certain embodiment(s) of the present disclosure.

In an embodiment, as shown in FIG. 8, for a pixel Q, the terminal may determine a distance L between the center of gravity P of a light source grid 801 and the pixel Q in a project scene. The terminal may calculate, based on the distance L and the grid area of the light source grid 801, a first solid angle β1 of the light source grid 801 relative to the pixel Q.

In an embodiment, the terminal may calculate the square of the distance between the center of gravity of the light source grid and the pixel in the project scene, to obtain a squared result. The terminal may take the ratio of the grid area of the light source grid to the squared result as the first solid angle of the light source grid relative to the pixel.

In an embodiment, the first solid angle of the light source grid relative to the pixel may be estimated by using the following formula:

SolidAngle≈TriangleArea/(Distance*Distance)

where SolidAngle represents the first solid angle (that is (31) of the light source grid relative to the pixel, TriangleArea represents the grid area of the light source grid, and Distance represents the distance (that is L) between the center of gravity of the light source grid and the pixel in the project scene.

In an embodiment, for each of the light source grids, the terminal may determine a normal vector of the light source grid. For each of the pixels of the image representing the project scene, the terminal may determine a normal vector of the pixel. The terminal may determine, according to the included angle between the normal vector of the light source grid and the normal vector of the pixel, the orientation of the light source grid relative to the pixel. If the orientation is forward, the step of determining, according to the first solid angle, the probability density distribution function value for sampling each of the sampling points is executed. If the orientation is backward, it means that the light source grid has no illumination contribution to the pixel.

In the embodiment, the first solid angle of the light source grid relative to the pixel can be rapidly determined based on the distance between the center of gravity of the light source grid and the pixel in the project scene, as well as the grid area of the light source grid. According to the first solid angle, the probability density distribution function value for sampling each of the sampling points can be rapidly determined, and the probability density distribution function value for sampling each of the sampling points can be directly used as the third contribution coefficient of the sampling point relative to the pixel, so that the calculation speed of the third contribution coefficient is improved.

In an embodiment, determining, for each of the light source grids, the direct illumination contribution value of the light source grid to each of the pixels of the image representing the project scene includes: determine, for each of the pixels of the image representing the project scene, a vector of each of edges formed by the pixel and each of vertexes of the light source grid; determine, according to the vector of each of the edges, a normal vector of each of the planes, where the pixel is located, of a polygonal pyramid formed by the pixel and the vertexes of the light source grid; determine, according to the normal vector of each of the planes where the pixel is located, a second solid angle of the light source grid relative to the pixel; and use the second solid angle as the direct illumination contribution value of the light source grid to the pixel in the project scene.

The second solid angle is a solid angle determined based on the normal vector of each of the planes where the pixel is located.

In certain embodiment(s), the pixel and the vertexes of the light source grid may be connected to form the polygonal pyramid. For each of the pixels of the image representing the project scene, the terminal may determine the vector of each of the edges formed by the pixel and each of the vertexes of the light source grid. The terminal may determine, according to the vector of each of the edges formed by the pixel and each of the vertexes of the light source grid, the normal vector of each of the planes, where the pixel is located, of the polygonal pyramid formed by the pixel and the vertexes of the light source grid. The terminal may determine, according to the normal vector of each of the planes where the pixel is located, the second solid angle of the light source grid relative to the pixel, and directly use the second solid angle as the direct illumination contribution value of the light source grid to the pixel in the project scene.

In an embodiment, the present disclosure provides another calculation method for the rendering illumination value of the pixel, the calculation method has a rendering equation as follows:

$$\frac{1}{N}\sum_{k=1}^{N}\frac{L_i(l_k)f(l_k,v)\cos\theta_{l_k}}{p(l_k,v)}\approx\left(\frac{1}{N}\sum_{k=1}^{N}L_i(l_k)\right)\left(\frac{1}{N}\sum_{k=1}^{N}\frac{f(l_k,v)\cos\theta_{l_k}}{p(l_k,v)}\right)$$

where $$\left(\frac{1}{1V}\sum_{k=1}^{N}L_i(l_k)\right)$$

represents the integration of the directions of all the incident light $l_k$. It is to be understood that the value of the second solid angle is equal to $$\left(\frac{1}{N}\sum_{k=1}^{N}L_i(l_k)\right),\text{ and}$$

$$\left(\frac{1}{N}\sum_{k=1}^{N}\frac{f(l_k,v)\cos\theta_{l_k}}{p(l_k,v)}\right)$$

is a constant pre-calculated by the terminal and stored locally. When the terminal performs direct illumination rendering on the pixel in the project scene, the constant can be directly used. It is to be understood that the terminal may use $$\left(\frac{1}{N}\sum_{k=1}^{N}L_i(l_k)\right)$$

as the direct illumination contribution value, and calculate, based on the direct illumination contribution value and the radiant illumination information of the light source grid, the rendering illumination value contributed by the light source grid to the pixel in the project scene.

Figure 9:
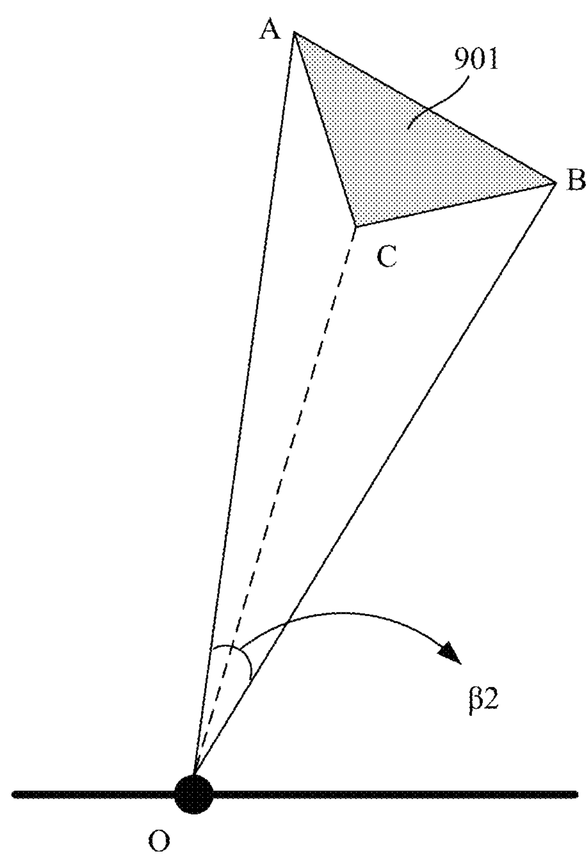
FIG. 9 is a schematic diagram of calculating a second solid angle according to certain embodiment(s) of the present disclosure.

In an embodiment, as shown in FIG. 9, a light source grid 901 is a light source triangular grid. In a polygonal pyramid formed by a pixel O and the vertexes (that is A, B and C) of a light source grid 901, the terminal may determine normal vectors of three planes (that is OAB, OAC and OBC) where the pixel O is located. The terminal may determine the included angles between any two normal vectors in the normal vectors of the three planes, and add the obtained three included angles. The terminal may use the difference between the result of adding the three included angles and Pi as a second solid angle β2 of the light source grid relative to the pixel.

For example, as shown in FIG. 9, the light source grid 901 is the light source triangular grid, and the terminal may use the location of the vertex A in the light source grid 901 as the location of the light source grid 901. The terminal may calculate, based on the location of the vertex A and vectors of two edges connected to the vertex A, vectors of the three vertexes of the light source grid 901. The vectors of the three vertexes of the light source grid 901 may be calculated by using the following formulas:

$$OA = \text{Triangle}\cdot Pos;$$

$$OB = \text{Triangle}\cdot Pos + \text{Triangle}\cdot \text{Edge0};$$

$$OC = \text{Triangle}\cdot Pos + \text{Triangle}\cdot \text{Edge1};$$

where OA, OB and OC represent the vectors between the pixel O and the three vertexes A, B and C respectively, Triangle.Pos represents the vector of the vertex A in the light source grid, and Triangle.Edge0 and Triangle.Edge1 represent the vectors of two edges connected to the vertex A.

The terminal may perform pairwise cross multiplication on the OA, OB and OC vectors, and calculate the normal vectors of the three planes OAC, OAB and OBC. The normal vectors of the three planes OAC, OAB and OBC may be calculated by using the following formulas:

$$n0 = \text{normalize}(\text{cross}(OB, OA));$$

$$n1 = \text{normalize}(\text{cross}(OA, OC));$$

$$n2 = \text{normalize}(\text{cross}(OC, OB));$$

where n0, n1 and n2 represent the normal vectors of the three planes OAB, OAC and OBC respectively, cross( ) represents performing pairwise cross multiplication on the normal vectors, normalize( ) represents performing normalization.

The terminal may calculate the included angles between any two of the normal vectors n0, n1 and n2. It is to be understood that the included angles are equal to the included angles between the planes OAB, OAC and OBC. The included angles between any two of the normal vectors n0, n1 and n2 may be calculated by using the following formulas:

$$\text{angle0} = a\cos(-\text{dot}(n0, n1));$$

$$\text{angle1} = a\cos(-\text{dot}(n1, n2));$$

$$\text{angle2} = a\cos(-\text{dot}(n2, n0));$$

where angle0 represents the included angle between the two normal vectors n0 and n1, angle1 represents the included angle between the two normal vectors n1 and n2, and angle2 represents the included angle between the two normal vectors n2 and n0.

The terminal may determine, according to the included angles angle0, angle1 and angle2, the second solid angle of the light source grid relative to the pixel. The second solid angle of the light source grid relative to the pixel may be calculate by using the following formula:

$$\text{SolidAngle} = \text{angle0} + \text{angle1} + \text{angle2} - Pi;$$

where SolidAngle represents the second solid angle (that is β2) of the light source grid relative to the pixel, and Pi represents the ratio of the circumference of a circle to its diameter.

In the embodiment, by determining the vector of each of the edges formed by the pixel and each of the vertexes of the light source grid, the normal vector of each of the planes, where the pixel is located, of the polygonal pyramid formed by the pixel and the vertexes of the light source grid can be determined according to the vector of each of the edges. According to the normal vector of each of the planes where the pixel is located, the second solid angle of the light source grid relative to the pixel can be determined, and the accuracy of the direct illumination contribution value can be improved by using the second solid angle as the direct illumination contribution value of the light source grid to the pixel in the project scene.

Figure 10:
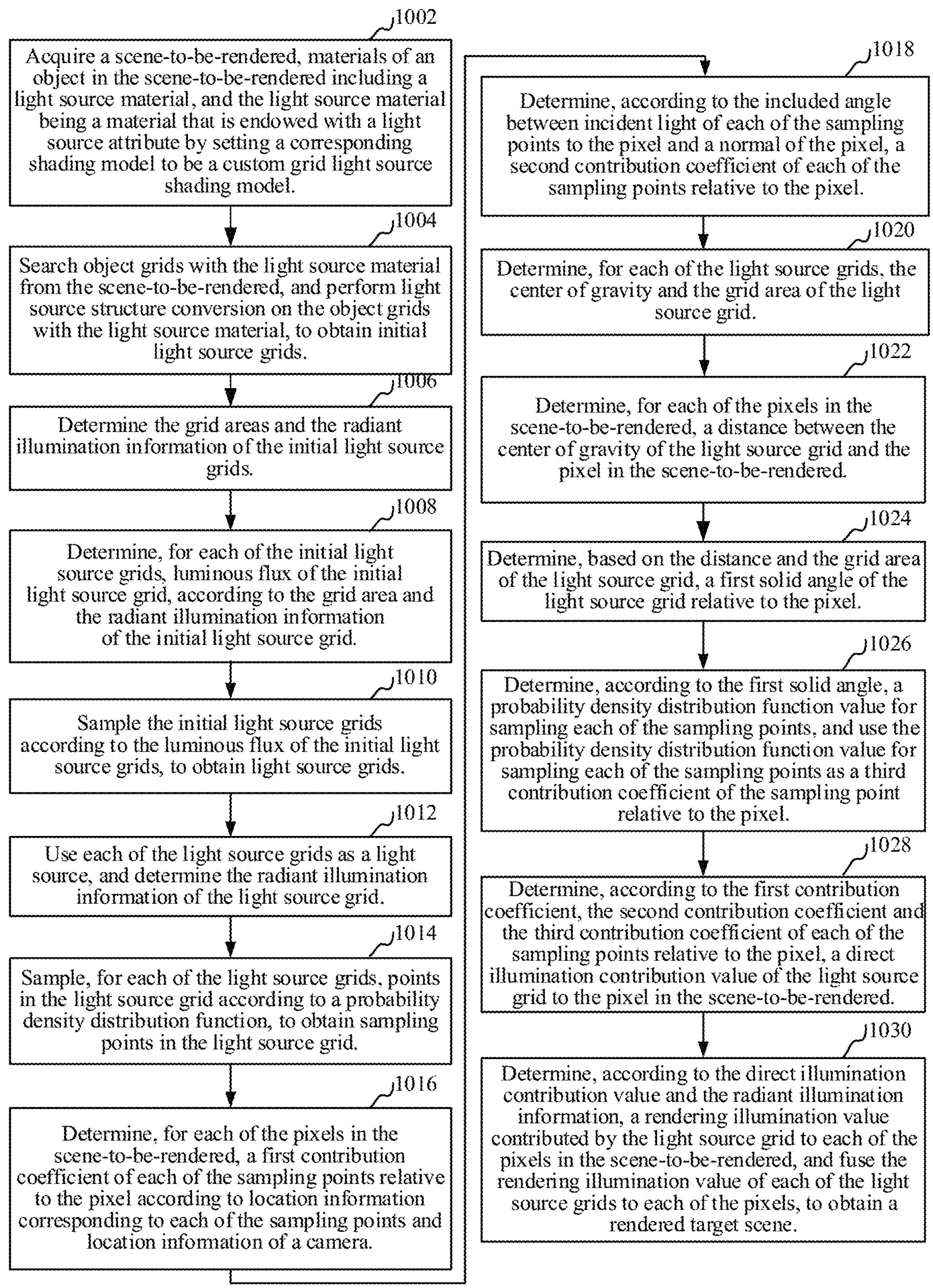
FIG. 10 is a schematic flowchart of an image rendering method according to certain embodiment(s) of the present disclosure.

As shown in FIG. 10, in an embodiment, an image rendering method is provided. The method includes the following steps:

Step 1002: Acquire a project scene. Materials of an object in the project scene includes a light source material. The light source material is a material that is endowed with a light source attribute by setting a corresponding shading model to be a custom grid light source shading model.

Step 1004: Search object grids with the light source material from the project scene, and perform light source structure conversion on the object grids with the light source material, to obtain initial light source grids.

Step 1006: Determine the grid areas and the radiant illumination information of the initial light source grids.

Step 1008: Determine, for each of the initial light source grids, luminous flux of the initial light source grid, according to the grid area and the radiant illumination information of the initial light source grid.

Step 1010: Sample the initial light source grids according to the luminous flux of the initial light source grids, to obtain light source grids.

Step 1012: Use each of the light source grids as a light source, and determine the radiant illumination information of the light source grid.

Step 1014: Sample, for each of the light source grids, points in the light source grid according to a probability density distribution function, to obtain sampling points in the light source grid.

Step 1016: Determine, for each of the pixels of the image representing the project scene, a first contribution coefficient of each of the sampling points relative to the pixel according to location information corresponding to each of the sampling points and location information of a camera.

Step 1018: Determine, according to the included angle between incident light of each of the sampling points to the pixel and a normal of the pixel, a second contribution coefficient of each of the sampling points relative to the pixel.

Step 1020: Determine, for each of the light source grids, the center of gravity and the grid area of the light source grid.

Step 1022: Determine, for each of the pixels of the image representing the project scene, a distance between the center of gravity of the light source grid and the pixel in the project scene.

Step 1024: Determine, based on the distance and the grid area of the light source grid, a first solid angle of the light source grid relative to the pixel.

Step 1026: Determine, according to the first solid angle, a probability density distribution function value for sampling each of the sampling points, and use the probability density distribution function value for sampling each of the sampling points as a third contribution coefficient of the sampling point relative to the pixel.

Step 1028: Determine, according to the first contribution coefficient, the second contribution coefficient and the third contribution coefficient of each of the sampling points relative to the pixel, a direct illumination contribution value of the light source grid to the pixel in the project scene.

In an embodiment, for each of the pixels of the image representing the project scene, a vector of each of the edges formed by the pixel and each of the vertexes of the light source grid is determined. According to the vector of each of the edges, a normal vector of each of the planes, where the pixel is located, of a polygonal pyramid formed by the pixel and the vertexes of the light source grid is determined. According to the normal vector of each of the planes where the pixel is located, a second solid angle of the light source grid relative to the pixel is determined. The second solid angle is used as the direct illumination contribution value of the light source grid to the pixel in the project scene.

Step 1030: Determine, according to the direct illumination contribution value and the radiant illumination information, a rendering illumination value contributed by the light source grid to each of the pixels of the image representing the project scene, and fuse the rendering illumination value of each of the light source grids to each of the pixels, to obtain a rendered target image.

The present disclosure further provides an implementation scene, the image rendering method being applied to the present disclosure scene. In certain embodiment(s), the image rendering method may be applied to a game image rendering scene. A terminal may acquire a game scene-to-be-rendered. Materials of an object in the game scene-to-be-rendered includes a light source material. The light source material is a material that is endowed with a light source attribute by setting a corresponding shading model to be a custom grid light source shading model. Object grids with the light source material are searched from the game scene-to-be-rendered, and light source structure conversion is performed on the object grids with the light source material, to obtain initial light source grids. The grid area and the radiant illumination information of the initial light source grids are determined. For each of the initial light source grids, luminous flux of the initial light source grid is determined according to the grid area and the radiant illumination information of the initial light source grid. The initial light source grids are sampled according to the luminous flux of the initial light source grids, to obtain light source grids.

The terminal may use each of the light source grids as a light source, and determine the radiant illumination information of the light source grid. For each of the light source grids, points in the light source grid are sampled according to a probability density distribution function, to obtain sampling points in the light source grid. For each of the pixels of an image representing the game scene-to-be-rendered, a first contribution coefficient of each of the sampling points relative to the pixel is determined according to location information corresponding to each of the sampling points and location information of a camera. According to the included angle between incident light of each of the sampling points to the pixel and a normal of the pixel, a second contribution coefficient of each of the sampling points relative to the pixel is determined. For each of the light source grids, the center of gravity and the grid area of the light source grid are determined. For each of the pixels in the image representing the game scene, a distance between the center of gravity of the light source grid and the pixel in the image is determined. Based on the distance and the grid area of the light source grid, a first solid angle of the light source grid relative to the pixel is determined. According to the first solid angle, a probability density distribution function value for sampling each of the sampling points is determined, and the probability density distribution function value for sampling each of the sampling points is used as a third contribution coefficient of the sampling point relative to the pixel. According to the first contribution coefficient, the second contribution coefficient and the third contribution coefficient of each of the sampling points relative to the pixel, a direct illumination contribution value of the light source grid to the pixel in the image representing the game scene is determined.

For each of the pixels in the image representing the game scene, the terminal may determine a vector of each of the edges formed by the pixel and each of the vertexes of the light source grid. According to the vector of each of the edges, a normal vector of each of the planes, where the pixel is located, of a polygonal pyramid formed by the pixel and the vertexes of the light source grid is determined. According to the normal vector of each of the planes where the pixel is located, a second solid angle of the light source grid relative to the pixel is determined. The second solid angle is used as the direct illumination contribution value of the light source grid to the pixel in the image.

The terminal may determine, according to the direct illumination contribution value and the radiant illumination information, a rendering illumination value contributed by the light source grid to each of the pixels of the image representing the game scene, and fuse the rendering illumination value of each of the light source grids to each of the pixels, to obtain a rendered target game image.

The present disclosure further additionally provides an implementation scene, the image rendering method being applied to the present disclosure scene. In certain embodiment(s), the image rendering method may be applied to an analog image rendering scene. A terminal may search object grids with a light source material from an analog image-to-be-rendered, and perform light source structure conversion on the object grids with the light source material to obtain light source grids. Each of the light source grids is used as the light source, to perform direct illumination rendering on each of the pixels of the image representing the project scene, to obtain a rendered target analog image.

It is to be understood that the present disclosure may be applied to scenes such as film and television special effects, visual design, virtual reality (VR), virtual targets, industrial simulation, and digital cultural creation. The virtual targets may include at least one of virtual characters, virtual animals and virtual objects. The digital cultural creation may include rendered buildings or tourist attractions. It is to be understood that rendering of virtual images may be involved in the scenes such as film and television special effects, visual design, VR, virtual targets, and digital cultural creation. The rendering of the virtual images in each of the scenes can be realized by using the image rendering method of the present disclosure. In certain embodiment(s), the terminal may search the object grids with the light source material from the virtual scene-to-be-rendered, and perform light source structure conversion on the object grids with the light source material to obtain the light source grids. By using each of the light source grids as the light source, direct illumination rendering can be performed on each of the pixels of an image representing the virtual scene-to-be-rendered. According to the image rendering method of the present disclosure, the rendering of the virtual scene is realized, and the illumination rendering effect of the virtual object in the scene can be improved, so that the noise of a finally rendered virtual image can be reduced, and the virtual image quality can be improved.

For example, in a digital cultural creation rendering scene, the rendering of buildings with cultural representative significance may be involved, such as the rendering of museums or historical buildings. The object grids with the light source material may be searched from a digital cultural creation scene-to-be-rendered, and converted into the light source grids, and by using each of the light source grids as the light source, direct illumination rendering can be performed on each of the pixels of an image representing the digital cultural creation scene, so as to improve the illumination rendering effect of rendering objects such as the buildings and get more realistic digital cultural and creative buildings.

For another example, in an industrial simulation scene, simulation rendering of an industrial production environment may be involved, such as a production workshop, an assembly line or production equipment of a simulation factory. Therefore, according to the image rendering method of the present disclosure, the object grids with the light source material can be searched from an industrial simulation scene and convert into the light source grids, and by using each of the light source grids as the light source, direct illumination rendering can be directly performed on each of the pixels of an image representing the industrial simulation scene, so that the illumination rendering effect of each of the rendering objects in the industrial simulation image can be improved, and a more referential industrial production simulation environment can be obtained.

It is to be understood that, although the steps in a flowchart of each of the embodiments are displayed sequentially, these steps are not necessarily performed sequentially according to the sequence. Unless otherwise explicitly specified in the present disclosure, execution of the steps is not strictly limited, and the steps may be performed in other sequences. Moreover, at least some of the steps in each of the embodiments may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Figure 11:
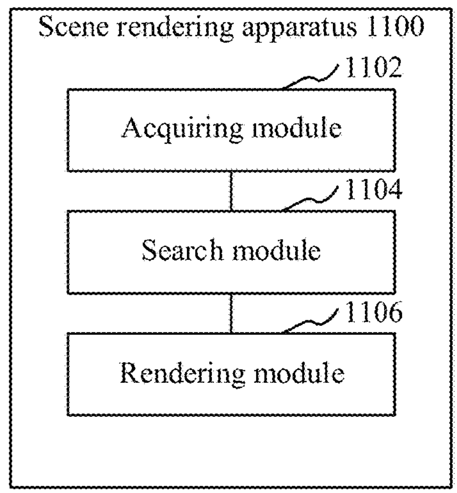
FIG. 11 is a structural block diagram of an image rendering apparatus according to certain embodiment(s) of the present disclosure.

In an embodiment, as shown in FIG. 11, an image rendering apparatus 1100 is provided. The apparatus may adopt a software module or a hardware module, or a combination of the two to become a part of a computing device. The apparatus includes:

- an acquiring module 1102, configured to acquire a project scene, materials of an object in the project scene including a light source material, and the light source material being a material that is endowed with a light source attribute by setting a corresponding shading model to be a custom grid light source shading model.
- a search module 1104, configured to search object grids with the light source material from the project scene, and perform light source structure conversion on the object grids with the light source material to obtain light source grids, the object grids being grids used for forming the grid of the object in the project scene; and
- a rendering module 1106, configured to use each of the light source grids as a light source, to perform direct illumination rendering on each of the pixels of the image representing the project scene, and fuse a direct illumination rendering result of each of the light source grids for each of the pixels to obtain a rendered target image.

In an embodiment, the same object in the project scene includes a plurality of grid regions of the same material. The grid regions of the same material are regions which are composed of a plurality of adjacent object grids of the same material in the same object. The search module 1104 is further configured to search the grid regions of the same material with the light source attribute from the grid regions of the same material in the project scene, to obtain self-luminous grid regions of the same material, each of the object grids included in the self-luminous grid regions of the same material being the object grid of the light source material; and perform light source structure conversion on the object grids of the light source material in the self-luminous grid region of the same material, to obtain the light source grids.

In an embodiment, the search module 1104 is further configured to acquire, for each of the self-luminous grid regions of the same material, a calculation scheduling instruction corresponding to the self-luminous grid region of the same material; and enable a calculation shader according to the calculation scheduling instruction, to execute a plurality of threads in the calculation shader, and perform light source structure conversion in parallel on the object grids of the light source material in the self-luminous grid region of the same material, to obtain the light source grids.

In an embodiment, the search module 1104 is further configured to enable a calculation shader according to a calculation scheduling instruction, so that the calculation shader enables threads of which the quantity is the same as the quantity of the object grids in the self-luminous grid region of the same material; and perform light source structure conversion in parallel on the object grids of the light source material in the self-luminous grid region of the same material through the enabled threads, of which the quantity is the same as the quantity of the object grids in the self-luminous grid region of the same material, to obtain the light source grids. Each of the object grids in the self-luminous grid region of the same material corresponds to one thread.

In an embodiment, the rendering module 1106 is further configured to use each of the light source grids as the light source, and determine the radiant illumination information of the light source grid; and perform, based on the radiant illumination information of each of the light source grids, direct illumination rendering on each of the pixels of the image representing the project scene.

In an embodiment, the radiant illumination information includes a radiant color value. The rendering module 1106 is further configured to, in response to that the light source grid is a solid color light source grid, use a self-luminous color value corresponding to the solid color light source grid as the radiant color value of the solid color light source grid, the self-luminous color value being a color value preset in a grid light source shading model corresponding to the solid color light source grid.

In an embodiment, the radiant illumination information includes a radiant color value. The rendering module 1106 is further configured to, in response to that the light source grid is a texture light source grid, determine an average color value of texture colors in the texture light source grid, to obtain the radiant color value of the texture light source grid.

In an embodiment, the rendering module 1106 is further configured to, in response to that the light source grid is a texture light source triangular grid, determine the length of each of edges in the texture light source triangular grid; determine the length of the shortest edge in the texture light source triangular grid, and determine a first texture information change rate of the texture light source triangular grid in a texture space; determine, according to the corresponding lengths of the two long edges of the texture light source triangular grid, a second texture information change rate of the texture light source triangular grid in the texture space; the two long edges being two edges except the shortest edge of the texture light source triangular grid; and determine, according to the first texture information change rate and the second texture information change rate corresponding to the texture light source triangular grid, the average color value of the texture colors in the texture light source triangular grid, to obtain the radiant color value of the texture light source triangular grid.

In an embodiment, the rendering module 1106 is further configured to use the first texture information change rate and the second texture information change rate corresponding to the texture light source triangular grid as parameters of a level determination function, to obtain a corresponding level of texture mapping; and use a texture color value corresponding to the level of texture mapping as the average color value of the texture colors in the texture light source triangular grid, to obtain the radiant color value of the texture light source triangular grid, The level determination function is a function that is pre-built and used for determining the level of texture mapping.

In an embodiment, the search module 1104 is further configured to perform light source structure conversion on the object grids of the light source material to obtain initial light source grids; determine the grid areas and the radiant illumination information of the initial light source grids; determine, for each of the initial light source grids, luminous flux of the initial light source grid, according to the grid area and the radiant illumination information of the initial light source grid; and sample, according to the luminous flux of the initial light source grids, the initial light source grids to obtain the light source grids.

In an embodiment, the rendering module 1106 is further configured to determine, for each of the light source grids, a direct illumination contribution value of the light source grid to each of the pixels of the image representing the project scene; determine, according to the direct illumination contribution value and the radiant illumination information, a rendering illumination value contributed by the light source grid to each of the pixels of the image representing the project scene. fuse the rendering illumination value of each of the light source grids for each of the pixels, to obtain the rendered target image.

In an embodiment, the rendering module 1106 is further configured to sample, for each of the light source grids, points in the light source grid according to a probability density distribution function, to obtain sampling points in the light source grid; determine, for each of the pixels of the image representing the project scene, a first contribution coefficient of each of the sampling points relative to the pixel according to location information corresponding to each of the sampling points and location information of a camera; determine, according to the included angle between incident light of each of the sampling points to the pixel and a normal of the pixel, a second contribution coefficient of each of the sampling points relative to the pixel; determine, according to a probability density distribution function value for sampling each of the sampling points, a third contribution coefficient of each of the sampling points relative to the pixel; and determine, according to the first contribution coefficient, the second contribution coefficient and the third contribution coefficient of each of the sampling points relative to the pixel, the direct illumination contribution value of the light source grid to the pixel in the project scene.

In an embodiment, the rendering module 1106 is further configured to determine, for each of the light source grids, the center of gravity and the grid area of the light source grid; determine, for each of the pixels of the image representing the project scene, a distance between the center of gravity of the light source grid and the pixel in the project scene; determine, based on the distance and the grid area of the light source grid, a first solid angle of the light source grid relative to the pixel; and determine, according to the first solid angle, a probability density distribution function value for sampling each of the sampling points, and use the probability density distribution function value for sampling each of the sampling points as the third contribution coefficient of the sampling point relative to the pixel.

In an embodiment, the rendering module 1106 is further configured to determine, for each of the pixels of the image representing the project scene, a vector of each of the edges formed by the pixel and each of the vertexes of the light source grid; determine, according to the vector of each of the edges, a normal vector of each of the planes, where the pixel is located, of a polygonal pyramid formed by the pixel and the vertexes of the light source grid; determine, according to the normal vector of each of the planes where the pixel is located, a second solid angle of the light source grid relative to the pixel; and use the second solid angle as the direct illumination contribution value of the light source grid to the pixel in the project scene.

The image rendering apparatus acquires the project scene. The materials of the object in the project scene include the light source material, the light source material being the material that is endowed with the light source attribute by setting the corresponding shading model to be the custom grid light source shading model. By searching the object grids with the light source material from the project scene, and performing light source structure conversion on the object grids with the light source material, the light source grids that can be directly used as the light sources can be obtained. By using each of the light source grids as the light source, direct illumination rendering can be performed on each of the pixels of the image representing the project scene; and by fusing the direct illumination rendering result of each of the light source grids for each of the pixels, the rendered target image can be obtained. By directly using the light source grid obtained through light source structure conversion as the light source to perform direct illumination rendering on each of the pixels of the image representing the project scene, the illumination rendering effect of the object in the scene can be improved, so that the noise of the finally rendered target image can be reduced, and the image quality can be improved.

Each module in the image rendering apparatus may be implemented entirely or partially through software, hardware, or a combination thereof. The modules may be embedded in or independent of a processor in a computing device in the form of hardware, and may also be stored in a memory of the computing device in the form of software, so as to facilitate the processor to call and execute operations corresponding to the modules.

In an embodiment, a computing device is provided. The computing device may be a terminal, and an internal structure diagram thereof may be shown in FIG. 12. The computing device includes a processor, a memory, an input/output interface, a communication interface, a display unit and an input apparatus. The processor, the memory and the input/output interface are connected through a system bus, and the communication interface, the display unit and the input apparatus are connected to the system bus through the input/output interface. The processor of the computing device is configured to provide computation and control ability. The memory of the computing device includes a non-volatile storage medium and an internal memory. The non-volatile storage medium stores an operating system and computer-readable instructions. The internal memory provides an operating environment for the operating system and the computer-readable instructions in the non-volatile storage medium. The input/output interface of the computing device is used for exchanging information between the processor and an external device. The communication interface of the computing device is used for communicating with external terminals in a wired or wireless mode, and the wireless mode may be realized by WIFI, mobile cellular network, near field communication (NFC) or other technologies. The computer-readable instructions are executed to implement an image rendering method. The display unit of the computing device is used for forming visually available images, and may be a display screen, a projection apparatus or a virtual reality imaging apparatus. The display screen may be a liquid crystal display screen or an e-ink display screen. The input apparatus of the computing device may be a touch layer covering the display screen, or may be a button, a trackball, or a touch pad disposed on a housing of the computing device, or may be an external keyboard, touch pad, a mouse or the like.

Figure 12:
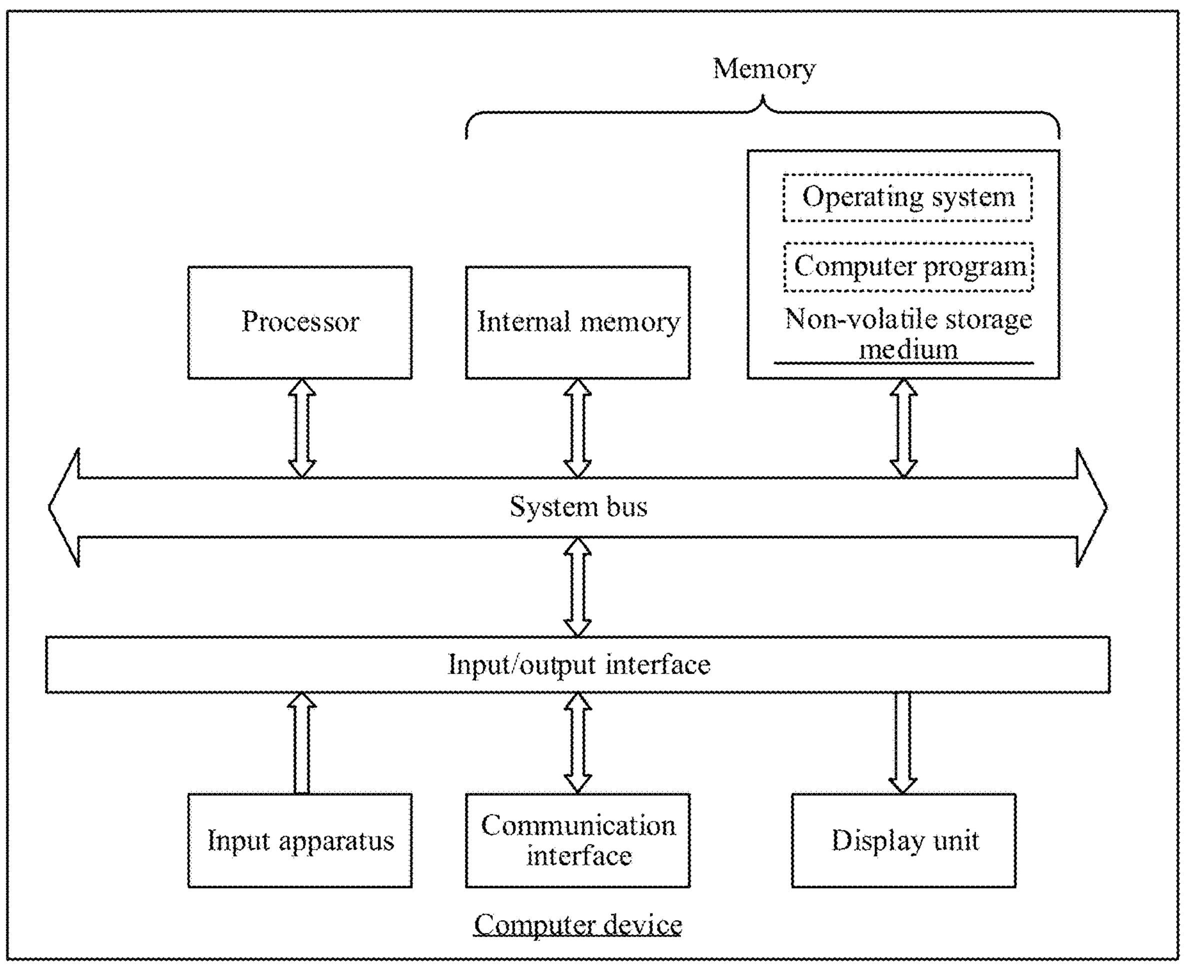
FIG. 12 is a diagram of an internal structure of a computing device according to certain embodiment(s) of the present disclosure.

A person skilled in the art may understand that, the structure shown in FIG. 12 is merely a block diagram of a partial structure related to a solution in the present disclosure, and does not constitute a limitation to the computing device to which the solution in the present disclosure is applied. In certain embodiment(s), the computing device may include more components or fewer components than those shown in the figure, or some components may be combined, or a different component deployment may be used.

In an embodiment, a computing device is further provided, including: a memory and one or more processors, the memory storing computer-readable instructions, and when executing the computer-readable instructions, the processor implementing the steps in the method embodiments.

In an embodiment, one or more computer-readable storage media are provided, in which computer-readable instructions are stored, the computer-readable instruction instructions, when executed by a processor, implementing steps in the method embodiments.

In an embodiment, a computer program product is further provided, including computer-readable instructions, the computer-readable instruction instructions, when executed by a processor, implementing steps in the method embodiments.

User information (including but not limited to user device information, user personal information, etc.) and data (including but not limited to data for analysis, stored data, displayed data, etc.) involved in the present disclosure are all information and data authorized by users or authorized by all parties, and the collection, use and processing of relevant data are to comply with relevant laws, regulations and standards of relevant countries and regions.

An ordinary person skilled in the art may understand that all or some of procedures of the methods in the embodiments may be implemented by computer-readable instructions instructing relevant hardware. The computer-readable instructions may be stored in a non-volatile computer-readable storage medium. When the computer-readable instructions are executed, the procedures of the method embodiments may be included. References to the memory, the storage, the database, or other medium used in the embodiments provided in the present disclosure may all include at least one of a non-volatile memory or a volatile memory. The non-volatile memory may be a read-only memory (ROM), a magnetic tape, a floppy disk, a flash memory or an optical memory, etc. The volatile memory may be a random access memory (RAM) or an external cache memory. As an illustration rather than a limitation, RAM may be in various forms, such as a static random access memory (SRAM) or a dynamic random access memory (DRAM).

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit may be implemented using one or more processors (or processors and memory). Likewise, a processor (or processors and memory) may be used to implement one or more units. Moreover, each unit may be part of an overall unit that includes the functionalities of the unit.

Technical features of the embodiments may be randomly combined. To make description concise, not all possible combinations of the technical features in the embodiments are described. However, the combinations of these technical features shall be considered as falling within the scope recorded by the present disclosure provided that no conflict exists.

The embodiments only describe several implementations of the present disclosure, which are described and in detail, but cannot be construed as a limitation to the patent scope of the present disclosure. For an ordinary person skilled in the art, several transformations and improvements can be made without departing from the idea of. The present disclosure. These transformations and improvements belong to the protection scope of. The present disclosure. Therefore, the protection scope of the patent of the present disclosure shall be subject to the appended claims.

What is claimed is:

1. An image rendering method, executed by a terminal, the method comprising:

acquiring a project scene, materials of an object in the project scene including a light source material, and the light source material being a material that is endowed with a light source attribute by setting a corresponding shading model to be a custom grid light source shading model, a same object in the project scene includes a plurality of grid regions of a same material, the grid regions of the same material are regions including a plurality of adjacent object grids of the same material in the same object, and the object grids being grids used for forming the object in the project scene;

searching, from the grid regions of the same material in the project scene, the grid regions of the same material with the light source attribute, to obtain self-luminous grid regions of the same material, each of the object grids included in the self-luminous grid regions of the same material being the object grid of the light source material;

performing light source structure conversion on the object grids with the light source material in the self-luminous grid region of the same material, to obtain the light source grids; and using each of the light source grids as a light source, to perform direct illumination rendering on each of pixels of an image representing the project scene, and fusing a direct illumination rendering result of each of the light source grids for each of the pixels to obtain a rendered target image.

2. The method according to claim 1, wherein performing the light source structure conversion comprises:

acquiring, for each of the self-luminous grid regions of the same material, a calculation scheduling instruction corresponding to the self-luminous grid region of the same material; and enabling a calculation shader according to the calculation scheduling instruction, to execute a plurality of threads in the calculation shader, and performing light source structure conversion in parallel on the object grids of the light source material in the self-luminous grid region of the same material, to obtain the light source grids.

3. The method according to claim 2, wherein enabling the calculation shader comprises:

enabling the calculation shader according to the calculation scheduling instruction, so that the calculation shader enables the threads of which the quantity is the same as the quantity of the object grids in the self-luminous grid region of the same material; and performing light source structure conversion in parallel on the object grids of the light source material in the self-luminous grid region of the same material through the enabled threads, of which the quantity is the same as the quantity of the object grids in the self-luminous grid region of the same material, to obtain the light source grids, each of the object grids in the self-luminous grid region of the same material corresponding to one thread.

4. The method according to claim 1, wherein using the each of the light source grids as the light source comprises:

using each of the light source grids as the light source, and determining radiant illumination information of the light source grid; and performing, based on the radiant illumination information of each of the light source grids, direct illumination rendering on each of the pixels of the image representing the project scene.

5. The method according to claim 4, wherein the radiant illumination information includes a radiant color value; and determining radiant illumination information of the light source grid comprises:

in response to that the light source grid is a solid color light source grid, using a self-luminous color value corresponding to the solid color light source grid as the radiant color value of the solid color light source grid, the self-luminous color value being a color value preset in a grid light source shading model corresponding to the solid color light source grid.

6. The method according to claim 4, wherein the radiant illumination information includes a radiant color value; and determining the radiant illumination information of the light source grid comprises:

in response to that the light source grid is a texture light source grid, determining an average color value of texture colors in the texture light source grid, to obtain the radiant color value of the texture light source grid.

7. The method according to claim 6, wherein determining the average color value of texture colors comprises:

in response to that the light source grid is a texture light source triangular grid, determining the length of each of edges in the texture light source triangular grid;

determining the length of the shortest edge of the texture light source triangular grid, and determining a first texture information change rate of the texture light source triangular grid in a texture space;

determining, according to the corresponding lengths of two long edges of the texture light source triangular grid, a second texture information change rate of the texture light source triangular grid in the texture space, the two long edges being two edges except the shortest edge of the texture light source triangular grid; and determining, according to the first texture information change rate and the second texture information change rate corresponding to the texture light source triangular grid, the average color value of the texture colors in the texture light source triangular grid, to obtain the radiant color value of the texture light source triangular grid.

8. The method according to claim 7, wherein determining the average color value of the texture colors comprises:

using the first texture information change rate and the second texture information change rate corresponding to the texture light source triangular grid as parameters of a level determination function, to obtain a corresponding level of texture mapping;

using a texture color value corresponding to the level of the texture mapping as the average color value of the texture colors in the texture light source triangular grid, to obtain the radiant color value of the texture light source triangular grid, the level determination function being a function that is pre-built and used for determining the level of the texture mapping.

9. The method according to claim 4, wherein performing the direct illumination rendering comprises:

determining, for each of the light source grids, a direct illumination contribution value of the light source grid to each of the pixels of the image representing the project scene; and determining, according to the direct illumination contribution value and the radiant illumination information, a rendering illumination value contributed by the light source grid to each of the pixels of the image representing the project scene; and fusing the direct illumination rendering result comprises:

fusing the rendering illumination value of each of the light source grids for each of the pixels, to obtain the rendered target image.

10. The method according to claim 9, wherein determining the direct illumination contribution value of the light source grid comprises:

sampling, for each of the light source grids, points in the light source grid according to a probability density distribution function, to obtain sampling points in the light source grid;

determining, for each of the pixels of the image representing the project scene, a first contribution coefficient of each of the sampling points relative to the pixel according to location information corresponding to each of the sampling points and location information of a camera;

determining, according to the included angle between incident light of each of the sampling points to the pixel and a normal of the pixel, a second contribution coefficient of each of the sampling points relative to the pixel;

determining, according to a probability density distribution function value for sampling each of the sampling points, a third contribution coefficient of each of the sampling points relative to the pixel; and determining, according to the first contribution coefficient, the second contribution coefficient and the third contribution coefficient of each of the sampling points relative to the pixel, the direct illumination contribution value of the light source grid to the pixel in the project scene.

11. The method according to claim 10, wherein determining the third contribution coefficient comprises:

determining, for each of the light source grids, the center of gravity and the grid area of the light source grid;

determining, for each of the pixels of the image representing the project scene, a distance between the center of gravity of the light source grid and the pixel in the project scene;

determining, based on the distance and the grid area of the light source grid, a first solid angle of the light source grid relative to the pixel; and determining, according to the first solid angle, a probability density distribution function value for sampling each of the sampling points, and using the probability density distribution function value for sampling each of the sampling points as the third contribution coefficient of the sampling point relative to the pixel.

12. The method according to claim 9, wherein determining the direct illumination contribution value comprises:

determining, for each of the pixels of the image representing the project scene, a vector of each of edges formed by the pixel and each of vertexes of the light source grid;

determining, according to the vector of each of the edges, a normal vector of each of planes, where the pixel is located, of a polygonal pyramid formed by the pixel and the vertexes of the light source grid;

determining, according to the normal vector of each of the planes where the pixel is located, a second solid angle of the light source grid relative to the pixel; and using the second solid angle as the direct illumination contribution value of the light source grid to the pixel in the project scene.

13. The method according to claim 1, wherein performing the light source structure conversion comprises:

performing light source structure conversion on the object grids of the light source material, to obtain initial light source grids;

determining the grid areas and the radiant illumination information of the initial light source grids;

determining, for each of the initial light source grids, luminous flux of the initial light source grid, according to the grid area and the radiant illumination information of the initial light source grid; and sampling, according to the luminous flux of the initial light source grids, the initial light source grids to obtain the light source grids.

14. An image rendering apparatus, the apparatus comprising: a memory storing computer program instructions; and a processor coupled to the memory and configured to execute the computer program instructions and perform:

acquiring a project scene, materials of an object in the project scene including a light source material, and the light source material being a material that is endowed with a light source attribute by setting a corresponding shading model to be a custom grid light source shading model, a same object in the project scene includes a plurality of grid regions of a same material, the grid regions of the same material are regions including a plurality of adjacent object grids of the same material in the same object, and the object grids being grids used for forming the object in the project scene;

searching, from the grid regions of the same material in the project scene, the grid regions of the same material with the light source attribute, to obtain self-luminous grid regions of the same material, each of the object grids included in the self-luminous grid regions of the same material being the object grid of the light source material;

performing light source structure conversion on the object grids with the light source material in the self-luminous grid region of the same material, to obtain the light source grids; and using each of the light source grids as a light source, to perform direct illumination rendering on each of pixels of an image representing the project scene, and fusing a direct illumination rendering result of each of the light source grids for each of the pixels to obtain a rendered target image.

15. The apparatus according to claim 14, wherein performing the light source structure conversion includes:

acquiring, for each of the self-luminous grid regions of the same material, a calculation scheduling instruction corresponding to the self-luminous grid region of the same material; and enabling a calculation shader according to the calculation scheduling instruction, to execute a plurality of threads in the calculation shader, and performing light source structure conversion in parallel on the object grids of the light source material in the self-luminous grid region of the same material, to obtain the light source grids.

16. The apparatus according to claim 14, wherein using the each of the light source grids as the light source includes:

using each of the light source grids as the light source, and determining radiant illumination information of the light source grid; and performing, based on the radiant illumination information of each of the light source grids, direct illumination rendering on each of the pixels of the image representing the project scene.

17. The apparatus according to claim 14, wherein performing the light source structure conversion includes:

performing light source structure conversion on the object grids of the light source material, to obtain initial light source grids;

determining the grid areas and the radiant illumination information of the initial light source grids;

determining, for each of the initial light source grids, luminous flux of the initial light source grid, according to the grid area and the radiant illumination information of the initial light source grid; and sampling, according to the luminous flux of the initial light source grids, the initial light source grids to obtain the light source grids.

18. A non-transitory computer-readable storage medium storing computer program instructions executable by at least one processor to perform:

acquiring a project scene, materials of an object in the project scene including a light source material, and the light source material being a material that is endowed with a light source attribute by setting a corresponding shading model to be a custom grid light source shading model, a same object in the project scene includes a plurality of grid regions of a same material, the grid regions of the same material are regions including a plurality of adjacent object grids of the same material in the same object, and the object grids being grids used for forming the object in the project scene;

searching, from the grid regions of the same material in the project scene, the grid regions of the same material with the light source attribute, to obtain self-luminous grid regions of the same material, each of the object grids included in the self-luminous grid regions of the same material being the object grid of the light source material;

performing light source structure conversion on the object grids with the light source material in the self-luminous grid region of the same material, to obtain the light source grids; and using each of the light source grids as a light source, to perform direct illumination rendering on each of pixels of the image representing the project scene, and fusing a direct illumination rendering result of each of the light source grids for each of the pixels to obtain a rendered target image.

* * * * *